(12) United States Patent
Yamasaki et al.

(10) Patent No.: US 7,911,908 B2
(45) Date of Patent: *Mar. 22, 2011

(54) OPTICAL HEAD AND DATA PROCESSING APPARATUS INCLUDING THE SAME

(75) Inventors: Fumitomo Yamasaki, Nara (JP); Tohru Nakamura, Katano (JP)

(73) Assignee: Panasonic Corporation, Osaka (JP)

( * ) Notice: Subject to any disclaimer, the term of this patent is extended or adjusted under 35 U.S.C. 154(b) by 251 days.

This patent is subject to a terminal disclaimer.

(21) Appl. No.: 12/237,863

(22) Filed: Sep. 25, 2008

(65) Prior Publication Data

US 2009/0040894 A1 Feb. 12, 2009

Related U.S. Application Data

(63) Continuation of application No. 10/865,470, filed on Jun. 10, 2004, now Pat. No. 7,443,774.

(30) Foreign Application Priority Data

Jun. 13, 2003 (JP) ................................ 2003-169064

(51) Int. Cl.
*G11B 7/13* (2006.01)
(52) U.S. Cl. ........................ 369/53.22; 369/94
(58) Field of Classification Search .................. 369/94, 369/44.41, 44.42, 53.22, 124.12, 53.23, 53.28, 369/44.27, 44.29
See application file for complete search history.

(56) References Cited

U.S. PATENT DOCUMENTS

| | | | | |
|---|---|---|---|---|
| 5,251,198 A | * | 10/1993 | Strickler | 369/94 |
| 5,862,118 A | * | 1/1999 | Takahashi | 369/44.23 |
| 5,903,530 A | * | 5/1999 | Tateishi et al. | 369/44.27 |
| 5,923,632 A | * | 7/1999 | Kato et al. | 369/112.07 |
| 6,307,926 B1 | | 10/2001 | Barton et al. | |
| 6,370,093 B1 | * | 4/2002 | Tada et al. | 369/44.25 |
| 6,438,088 B1 | * | 8/2002 | Sugiyama et al. | 369/112.01 |
| 6,442,125 B1 | * | 8/2002 | Maeda et al. | 369/112.1 |

(Continued)

FOREIGN PATENT DOCUMENTS

CN 1169573 A 1/1998

(Continued)

OTHER PUBLICATIONS

ECMA Standardizing Information and Communication Systems, "Standard ECMA-267, 3rd edition, 120 mm DVD-read-only Disk"; ECMA Technical Commitee; 272:1-86 (Apr. 2001).

Yanxiong et al., "Research on Laser Damage of Four-quadrant Photodetector", Journal of Optoelectronics Laser, vol. 10, No. 3 (1999).

*Primary Examiner* — Wayne R Young
*Assistant Examiner* — Thomas D Alunkal
(74) *Attorney, Agent, or Firm* — Panitch Schwarze Belisario & Nadel LLP

(57) ABSTRACT

An optical data processing apparatus reads and/or writes data from/on a data storage medium, in which first and second data storage layer are stacked. The apparatus includes: a light detector including at least one photodetector for generating a light quantity signal; a detecting optical system for guiding reflected light beams from a storage layer; and a signal processor for generating a layer sensing signal from the light quantity signal and determining, by the layer sensing signal, the type of data storage medium. The light detector includes a layer sensing photodetector arranged in view of an of an area of the light detector, and further includes a photodetector which is different from the layer sensing photodetector which receives the reflected light beam to generate a focus signal.

6 Claims, 12 Drawing Sheets

U.S. PATENT DOCUMENTS

| | | | |
|---|---|---|---|
| 6,469,965 B1 * | 10/2002 | Horita | 369/53.2 |
| 6,731,578 B1 * | 5/2004 | Sako et al. | 369/53.23 |
| 7,054,240 B2 * | 5/2006 | Song et al. | 369/44.29 |
| 7,130,250 B2 * | 10/2006 | Fujiune et al. | 369/44.27 |
| 7,280,453 B2 | 10/2007 | Arai | |
| 7,307,926 B2 | 12/2007 | Kuwahara et al. | |
| 7,307,933 B2 | 12/2007 | Fujiune et al. | |
| 7,443,774 B2 * | 10/2008 | Yamasaki et al. | 369/53.22 |
| 2002/0150017 A1 * | 10/2002 | Ono et al. | 369/53.23 |
| 2002/0159342 A1 * | 10/2002 | Ogasawara et al. | 369/44.23 |
| 2003/0012109 A1 * | 1/2003 | Tsai | 369/53.28 |

FOREIGN PATENT DOCUMENTS

| | | |
|---|---|---|
| EP | 0777217 A2 | 6/1997 |
| EP | 0780838 A1 | 6/1997 |
| JP | 08-185635 A | 7/1996 |
| JP | 09-259456 A | 10/1997 |
| JP | 2002-260250 A | 9/2002 |
| JP | 2004-134061 A | 4/2004 |
| JP | 2004-146016 A | 5/2004 |
| WO | 03/063150 A1 | 7/2003 |

* cited by examiner

FIG.15
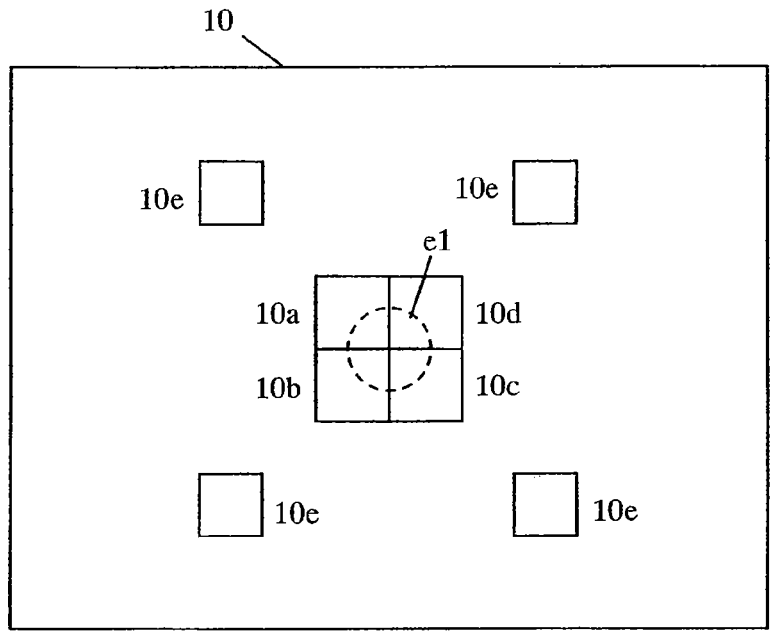
FIG.16A
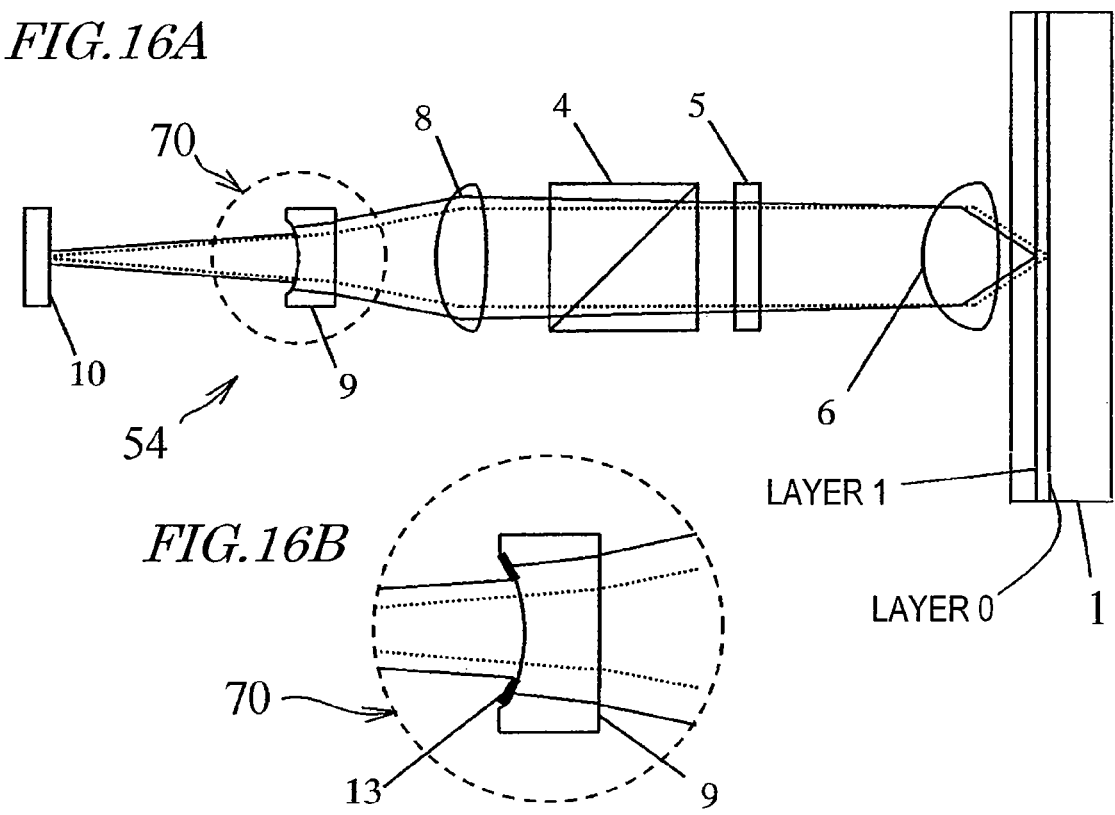
FIG.16B

US 7,911,908 B2

OPTICAL HEAD AND DATA PROCESSING APPARATUS INCLUDING THE SAME

CROSS-REFERENCE TO RELATED APPLICATIONS

This application is a continuation of U.S. patent application Ser. No. 10/865,470, filed Jun. 10, 2004, and the disclosure of which is incorporated herein by reference.

BACKGROUND OF THE INVENTION

1. Field of the Invention

The present invention relates to an optical head for optically reading and/or writing data from/on an optical data storage medium (such as an optical disc) including multiple data storage layers and also relates to an optical data processing apparatus including such an optical head.

2. Description of the Related Art

Various techniques have been developed in order to increase the storage capacity of an optical disc in one way or another. For example, as some people proposed it, the storage density or capacity of an optical disc is increased either by shortening the wavelength of a laser beam for use to read and write data from/on the disc or by increasing the numerical aperture (NA) of an objective lens for focusing the laser beam on the disc. Others proposed that the storage capacity be increased by providing multiple data storage layers, on which data can be written, for a single optical disc. In this technique, the storage capacity of an optical disc can be increased without changing the wavelength of a laser light source or the numerical aperture of an objective lens to be built in an optical head. And this technique has already been applied to a digital versatile disc (DVD) and other storage media. For instance, a single-sided two-layered DVD includes two data storage layers, from each of which data can be read by being irradiated with a laser beam coming from the same direction.

In reading and/or writing data from/on an optical disc including two or more data storage layers to increase the overall storage capacity, the optical disc drive needs to perform a process of sensing on what data storage layer the laser beam is currently focused by the objective lens (i.e., what is called a "layer sensing process"). Japanese Laid-Open Publication No. 9-259456 discloses how such a layer sensing process works in the prior art. Hereinafter, the conventional layer sensing process will be described with reference to FIGS. 19 through 22.

FIG. 19 shows a schematic configuration for members of an optical head 100 to carry out the layer sensing process. The optical disc 107 illustrated in FIG. 19 includes two data storage layers (i.e., Layer 0 and Layer 1). In this description, one data storage layer, which is more distant from an objective lens 106 of the optical head 100 (i.e., the deeper data storage layer), will be referred to herein as "Layer 0", while the other data storage layer, which is closer to the objective lens 106 (i.e., the shallower data storage layer), will be referred to herein as "Layer 1".

If a semiconductor laser diode 101 has radiated a linearly polarized laser beam, then a diffraction grating 102 produces three beams, consisting of a main beam and two sub-beams sandwiching the main beam, from the laser beam. Those beams are then transformed by a collimator lens 103 into a substantially parallel light beam, which is reflected by a beam splitter 104 and then transformed into a circularly polarized light beam by a quarter wave plate 105. Subsequently, the circularly polarized light beam is focused by the objective lens 106 on either Layer 0 or Layer 1 of the optical disc 107 by way of its substrate. It should be noted that the diffraction grating 102 is adjusted so as to perform a tracking control operation by a three-beam method.

Next, the laser beam is reflected by either Layer 0 or Layer 1 of the optical disc 107, transmitted through the substrate and objective lens 106 again, and then transformed by the quarter wave plate 105 into a different linearly polarized light beam from the previous one, which is subsequently transmitted through the beam splitter 104 and then focused by a detector lens 108 onto a light detector 10. The light detector 110 includes a number of photodetectors, each of which generates and outputs a light quantity signal having a level that represents the quantity of the light received there.

FIG. 20 shows an arrangement of five photodetectors 110a, 110b, 110c, 110d and 110e provided for the light detector 110. The light detector 110 includes a quadrant photodetector 110a for receiving the main beam, two photodetectors 110b and 110c for receiving the sub-beams to detect a tracking error signal, and two more photodetectors 110d and 110e for receiving the sub-beams for layer sensing purposes. The main beam of the laser beam, which has been reflected from a predetermined data storage layer of the optical disc 107, forms a beam spot m on the photodetector 110a, while the two sub-beams thereof form beam spots s on the photodetectors 110b and 110c, respectively. As shown in FIG. 20, the photodetector 110b, quadrant photodetector 110a, and photodetector 110c are arranged in line in this order from left to right. The photodetector 110d is provided between the photodetector 110b and quadrant photodetector 110a, while the other photodetector 110e is provided on the opposite side of the photodetector 110c (i.e., so as not to face the quadrant photodetector 110a).

FIG. 21 shows where the respective reflected beams are incident on the light detector 110 when the laser beam is focused by the objective lens on Layer 0 of the optical disc 107. As shown in FIG. 21, the main beam reflected from Layer 0 forms a beam spot m0 approximately at the center of the photodetector 110a, while the sub-beams reflected from Layer 0 form beam spots s0 approximately at the respective centers of the photodetectors 110b and 110c. At the same time, the laser beam reflected from the other Layer 1 also forms bigger beam spots m1 and s1 with lower intensities. It should be noted that the center of the beam spot m1 formed by the main beam that has been reflected from Layer 1 substantially matches that of the beam spot m0 formed by the main beam that has been reflected from Layer 0. On the other hand, the center of each beam spot s1 formed by the sub-beam that has been reflected from Layer 1 significantly shifts from that of its associated beam spot s0 formed by the sub-beam that has been reflected from Layer 0.

FIG. 22 shows where the respective reflected beams are incident on the light detector 110 when the laser beam is focused by the objective lens on Layer 1 of the optical disc 107. As shown in FIG. 22, the main beam reflected from Layer 1 forms a beam spot m1 approximately at the center of the photodetector 110a, while the sub-beams reflected from Layer 1 form beam spots s1 approximately at the respective centers of the photodetectors 110b and 110c. At the same time, the laser beam reflected from the other Layer 0 also forms bigger beam spots m0 and s0 with lower intensities. It should be noted that the center of the beam spot m0 formed by the main beam that has been reflected from Layer 0 substantially matches that of the beam spot m1 formed by the main beam that has been reflected from Layer 1. On the other hand, the center of each beam spot s0 formed by the sub-beam that has been reflected from Layer 0 slightly shifts from that of its associated beam spot s1 formed by the sub-beam that has been reflected from Layer 1.

In this case, the layer sensing signal RD is given by:

RD=(output light quantity signal of photodetector 110d)−(output light quantity signal of photodetector 110e)

For example, if RD>0, then it can be sensed that beam spot is formed on Layer 0. On the other hand, if RD<0, then it can be sensed that beam spot is formed on Layer 1.

However, this layer sensing method is supposed to use sub-beams by the three-beam method, and cannot be applied to an optical head that adopts a one-beam method using no sub-beams or to an optical drive including such an optical head. The three-beam method is much more complicated in configuration and processing than the one-beam method. Thus, there is a growing demand for a layer sensing process that adopts the simpler one-beam method. Also, according to the three-beam method, the sub-beams have such small light quantities that the beam spots to be detected have just low intensities and relatively broad areas. Thus, it is difficult to achieve a sufficiently high SNR in such a situation.

BRIEF SUMMARY OF THE INVENTION

In order to overcome the problems described above, preferred embodiments of the present invention provide an optical head, which can perform a layer sensing process without depending on the tracking error detecting method and with signals having high SNR used, and an optical data processing apparatus including such an optical head.

An optical data processing apparatus according to a preferred embodiment of the present invention is used to read and/or write data from/on a data storage medium, in which a first data storage layer and a second data storage layer are stacked in this order toward a surface, by radiating light through the surface toward the first data storage layer and the second data storage layer. The optical data processing apparatus preferably includes a light source, a focusing optical system, a light detector, a detecting optical system, and a signal processor. The light source preferably radiates the light. The focusing optical system preferably forms a focal spot by condensing the light that has been emitted from the light source. The light detector preferably includes at least one photodetector for receiving the light and generating a light quantity signal representing the quantity of the light received. The detecting optical system preferably guides first and second reflected light beams, which have been reflected from the first and second data storage layers, respectively, to the light detector. The signal processor preferably generates a layer sensing signal from the light quantity signal and determines, by the layer sensing signal, whether the focal spot is now located near the first data storage layer of the data storage medium loaded or near the second data storage layer thereof. The detecting optical system preferably includes an optical element that produces astigmatism to the first and second reflected light beams. The light detector preferably includes, as the at least one photodetector, a layer sensing photodetector, which is arranged in view of an area of the light detector where the second reflected light beam is incident when the focal spot is located near the first data storage layer and another area of the light detector where the first reflected light beam is incident when the focal spot is located near the second data storage layer.

In one preferred embodiment of the present invention, the layer sensing photodetector is preferably arranged in the area of the light detector where one of the first and second reflected light beams is incident.

In this particular preferred embodiment, with the astigmatism produced, each of the first and second reflected light beams preferably has a first axis and a second axis, which are both perpendicular to the optical axis of the reflected light beam and which cross each other at right angles. When the focal spot is located near the first data storage layer, the second reflected light beam is preferably converged at the first axis thereof before entering the light detector. The layer sensing photodetector is preferably arranged along an axis, which is defined in the light detector so as to correspond with the first axis.

More specifically, multiple layer sensing photodetectors, including the at least one layer sensing photodetector, are preferably arranged substantially symmetrically with respect to the center of the optical axis.

In an alternative preferred embodiment, the light detector preferably further includes a processing photodetector for receiving the first reflected light beam when the focal spot is located near the first data storage layer and the second reflected light beam when the focal spot is located near the second data storage layer. The signal processor preferably generates a focus error signal based on the light quantity signal representing the quantity of light received at the processing photodetector and preferably locates the focal spot by the focus error signal.

In another preferred embodiment, the light detector preferably further includes at least one auxiliary photodetector, which is arranged along an axis that is defined in the light detector so as to correspond with the second axis. When the focal spot is located near the first data storage layer, the second reflected light beam is preferably converged behind the light detector with respect to the second axis. The signal processor preferably generates the layer sensing signal based on the quantity of light received at the auxiliary photodetector, too.

In this particular preferred embodiment, multiple layer sensing photodetectors, including the at least one layer sensing photodetector, are preferably arranged substantially symmetrically with respect to the center of the optical axis. And multiple auxiliary photodetectors, including the at least one auxiliary photodetector, are preferably arranged substantially symmetrically with respect to the center of the optical axis.

In another preferred embodiment, the signal processor preferably generates the layer sensing signal by dividing a difference between the light quantity signals supplied from the layer sensing and auxiliary photodetectors by the sum of the light quantity signals supplied from the layer sensing and auxiliary photodetectors.

In still another preferred embodiment, when the focal spot is located near the second data storage layer, the detecting optical system preferably converges the first reflected light beam on the vicinity of the optical element and the second reflected light beam on the light detector, respectively.

In yet another preferred embodiment, when the focal spot is located near the second data storage layer, the detecting optical system preferably converges the first reflected light beam ahead of the optical element and the second reflected light beam on the light detector, respectively.

In yet another preferred embodiment, the detecting optical system preferably includes a shielding member for cutting off a portion of the light. When the focal spot is located near the second data storage layer, the detecting optical system preferably converges the first reflected light beam on the vicinity of the shielding member so as to prevent the first reflected light beam from entering the light detector and also converges the second reflected light beam on the light detector.

In an alternative preferred embodiment, the detecting optical system preferably includes a shielding member that has an opening for cutting off an edge portion of the light. When the focal spot is located near the first data storage layer, the detecting optical system preferably gets the edge portion of the second reflected light beam cut off by the shielding member such that the second reflected light beam entering the light detector has a reduced beam cross-section.

In yet another preferred embodiment, each of the first and second data storage layers preferably stores its own identification information. The signal processor preferably acquires the identification information, determines, by the identification information, on which of the data storage layers the focal spot is currently located, and compares two decision results, which are based on the layer sensing signal and the identification information, respectively, thereby verifying the accuracy of the decision result based on the layer sensing signal.

In this particular preferred embodiment, each of the first and second data storage layers preferably includes a plurality of data tracks on which the data is written. A unique address is preferably allocated to each said data track to specify a data location on the data storage medium. The signal processor preferably acquires the address as a piece of the identification information.

In another preferred embodiment, if the signal processor has located, as a result of the verification, the focal spot near the other data storage layer contrary to the decision result based on the layer sensing signal, then the signal processor preferably shifts the focal spot to the vicinity of the data storage layer being designated by the layer sensing signal.

In yet another preferred embodiment, the data storage medium preferably includes a number N+1 (where N is a natural number) of data storage layers. The second storage layer is preferably one of the N data storage layers except the deepest layer, and the first data storage layer is preferably deeper than the second data storage layer, as viewed from the light source.

An optical data processing apparatus according to another preferred embodiment of the present invention is selectively loadable with one of multiple types of data storage media in order to read and/or write data from/on the loaded data storage medium by radiating light toward the data storage medium. The multiple types of the data storage media differs according to whether a data storage medium is single-layered or multi-layered. The optical data processing apparatus preferably includes a light source, a focusing optical system, a light detector, a detecting optical system, and a signal processor. The light source preferably radiates the light. The focusing optical system preferably forms a focal spot by condensing the light that has been emitted from the light source. The light detector preferably includes at least one photodetector for receiving the light and generating a light quantity signal representing the quantity of the light received. The detecting optical system preferably guides a light beam, which has been reflected from the data storage layer, to the light detector. The signal processor preferably generates a layer sensing signal from the light quantity signal and preferably recognizes the type of the loaded data storage medium by the layer sensing signal. The detecting optical system preferably includes an optical element that produces astigmatism to the reflected light beam. If the data storage medium includes first and second data storage layers, the light detector preferably includes, as the at least one photodetector, a layer sensing photodetector, which is arranged in view of an area of the light detector where the light beam reflected from the second data storage layer is incident when the focal spot is located near the first data storage layer and another area of the light detector where the light beam reflected from the first data storage layer is incident when the focal spot is located near the second data storage layer.

In one preferred embodiment of the present invention, the signal processor preferably senses the number of the data storage layer(s) included in the loaded data storage medium by a level of the layer sensing signal when the focal spot is located near the data storage layer.

An optical head according to a preferred embodiment of the present invention is used to read and/or write data from/on a data storage medium, in which a first data storage layer and a second data storage layer are stacked in this order toward a surface, by radiating light through the surface toward the first data storage layer and the second data storage layer. The head preferably includes a light source, a focusing optical system, a light detector, a detecting optical system, and a signal processor. The light source preferably radiates the light. The focusing optical system preferably forms a focal spot by condensing the light that has been emitted from the light source. The light detector preferably includes at least one photodetector for receiving the light and generating a light quantity signal representing the quantity of the light received. The detecting optical system preferably guides first and second reflected light beams, which have been reflected from the first and second data storage layers, respectively, to the light detector. The signal processor preferably generates a layer sensing signal from the light quantity signal and preferably determines, by the layer sensing signal, whether the focal spot is now located near the first data storage layer of the data storage medium loaded or near the second data storage layer thereof. The detecting optical system preferably includes an optical element that produces astigmatism to the first and second reflected light beams. The light detector preferably includes, as the at least one photodetector, a layer sensing photodetector, which is arranged in view of an area of the light detector where the second reflected light beam is incident when the focal spot is located near the first data storage layer and another area of the light detector where the first reflected light beam is incident when the focal spot is located near the second data storage layer.

A signal processor according to a preferred embodiment of the present invention is supposed to be built in a read/write drive for reading and/or writing data from/on a data storage medium, in which a first data storage layer and a second data storage layer are stacked in this order toward a surface, by radiating light through the surface toward the first data storage layer and the second data storage layer. The drive preferably includes a light source, a focusing optical system, a light detector and a detecting optical system. The light source preferably radiates the light. The focusing optical system preferably forms a focal spot by condensing the light that has been emitted from the light source. The light detector preferably includes at least one photodetector for receiving the light and generating a light quantity signal representing the quantity of the light received. The at least one photodetector is preferably a layer sensing photodetector arranged in view of an area of the light detector where second light beam reflected from the second data storage layer is incident when the focal spot is located near the first data storage layer and another area of the light detector where first reflected light beam is incident when the focal spot is located near the second data storage layer. The detecting optical system preferably includes an optical element that produces astigmatism to the first and second reflected light beams and preferably guides the first and second reflected light beams to the light detector. The signal processor preferably generates a layer sensing signal from the light quantity signal and preferably determines, by the layer sensing signal, whether the focal spot is now located near the first data storage layer of the data storage medium loaded or near the second data storage layer thereof.

According to any of various preferred embodiments of the present invention described above, a layer sensing signal is generated based on the light reflected from not a data storage layer of an optical data storage medium, on which a focal spot is currently formed by an objective lens, but another layer. The reflected light changes the shape of its beam spot on a photodetector depending on the location of the focal spot. Accordingly, the layer on which the focal spot is currently located can be sensed accurately enough based on the layer sensing signal and a focus error signal as well. The light reflected from that layer has such a high intensity to detect it easily. Thus, the layer sensing signal can be generated at a sufficiently high SNR. This process can be done without using the sub-beams of the conventional three-beam method. Thus, the layer sensing process according to any of various preferred embodiments of the present invention can be carried out with an optical head that adopts the one-beam method.

Other features, elements, processes, steps, characteristics and advantages of the present invention will become more apparent from the following detailed description of preferred embodiments of the present invention with reference to the attached drawings.

BRIEF DESCRIPTION OF THE SEVERAL VIEWS OF THE DRAWINGS

FIG. 15 shows the beam spot shape of a reflected light beam entering the light detector 10 when the focal spot of the laser beam is located near Layer 1 of the optical disc 1;

FIG. 16A shows a configuration for an optical disc drive 54 according to a fourth specific preferred embodiment of the present invention;

FIG. 16B shows a surrounding portion 70 of the anamorphic lens 9 on a larger scale;

DETAILED DESCRIPTION OF THE INVENTION

Figure 1A:
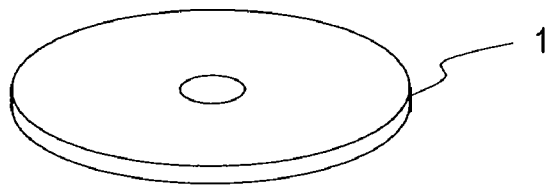
FIG. 1A illustrates the appearance of an optical disc 1.

Hereinafter, preferred embodiments of the present invention will be described with reference to the accompanying drawings. In the drawings, components appearing in multiple sheets and identified by the same reference numeral are supposed to have identical function and configuration and operate in substantially the same way. Before various preferred embodiments of the present invention are actually described, an optical data storage medium, from/on which an optical data processing apparatus according to a preferred embodiment of the present invention reads and writes data, will be described. In the following description of preferred embodiments, an optical disc is used as an exemplary optical data storage medium. However, the present invention is also applicable to a memory card from which data can be read optically.

FIG. 1A illustrates the appearance of an optical disc 1, which is a disk storage medium such as a CD, a DVD or a Blu-ray Disc (BD). To read and/or write data from/on this optical disc 1, an optical disc drive needs to irradiate one side of the optical disc 1 with a light beam such as a laser beam. The data is written on a data storage layer made of a phase change material, for example (which will be simply referred to herein as a "layer"). More specifically, the layer has multiple data tracks (not shown), which may be arranged spirally, for example. Each of those data tracks is defined as a unit on a land or a groove of the data storage layer and is given a unique address for identification purposes. The data is written on those data tracks.

Figure 1B:
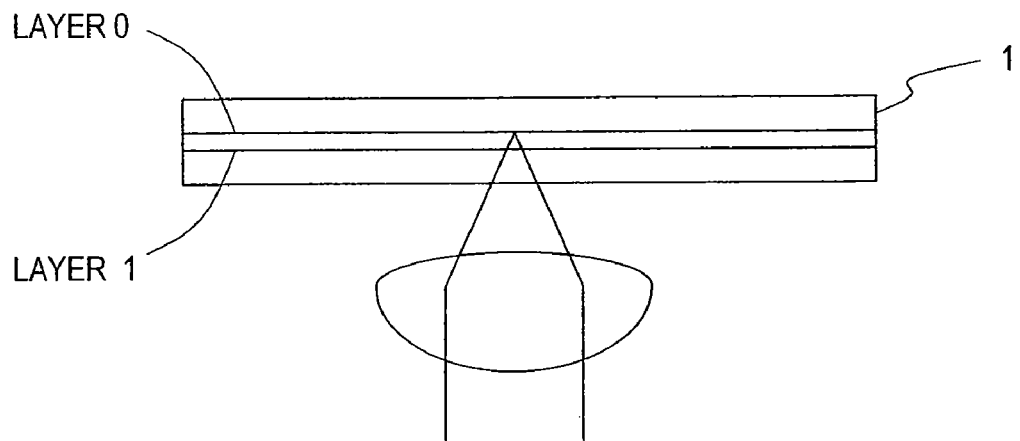
FIG. 1B is a cross-sectional view illustrating an optical disc 1 including two layers.
Figure 1C:
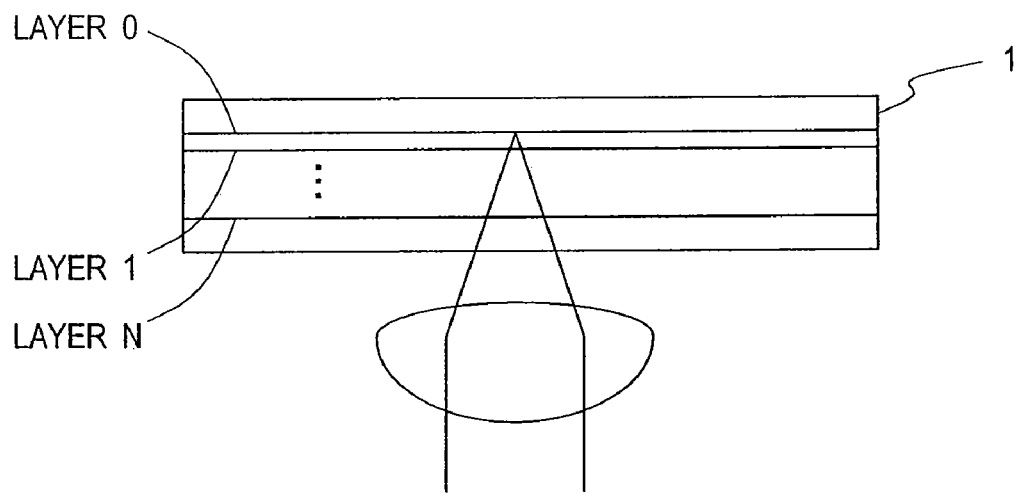
FIG. 1C is a cross-sectional view of an optical disc 1 including a number (N+1) layers.

In various preferred embodiments of the present invention, the optical disc 1 does not always have just one layer but may have two or more layers that are stacked one upon the other. FIG. 1B is a cross-sectional view illustrating an optical disc 1 including two layers. In FIG. 1B, a light beam that has been radiated from under Layer 1, passed through a surface of the optical disc 1 and then focused on Layer 0 is also illustrated for reference. The layer depths of the optical disc 1 change according to the type of the optical disc 1. For example, in a BD, Layer 0 is provided at a depth of 100 µm as measured from the surface of the disc on which the light beam is incident (which will be referred to herein as a "light incidence side") and Layer 1 is located about 25 µm shallower than Layer 0. These layers have their respective reflectances and reflect the light beams received. It should be noted that a substrate, functioning as a protective coating, is present between the light incidence side and Layer 1. FIG. 1C is a cross-sectional view of an optical disc 1 including a number (N+1) layers (where N is a natural number). These layers may be provided at regular intervals of 25 µm, for example. In the other respects, the optical disc 1 shown in FIG. 1C has the same configuration as the two-layered disc shown in FIG. 1B.

Figure 1D:
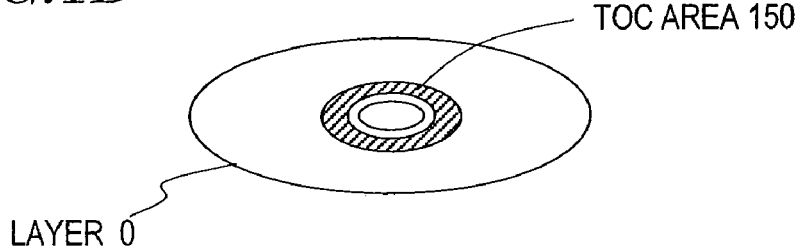
FIG. 1D illustrates a TOC area 150 provided on Layer 0.

FIG. 1D illustrates a TOC (table of contents) area 150 provided as the innermost area on Layer 0. In the TOC area 150, TOC information, showing what types of data are stored on what locations on the disc, is stored. That is to say, the TOC information is a table of contents as the name signifies. Accordingly, before gaining access to the data on the optical disc 1, first of all, the optical disc drive needs to read out the TOC information from the TOC area 150. For that purpose, Layer 0 must be sensed accurately, thus making the layer sensing process of the present invention even more important.

Hereinafter, an optical disc drive according to a preferred embodiment of the present invention will be described. In the following description of preferred embodiments, the optical disc 1 is supposed to have two layers (i.e., Layer 0 and Layer 1).

Embodiment 1

Figure 2:
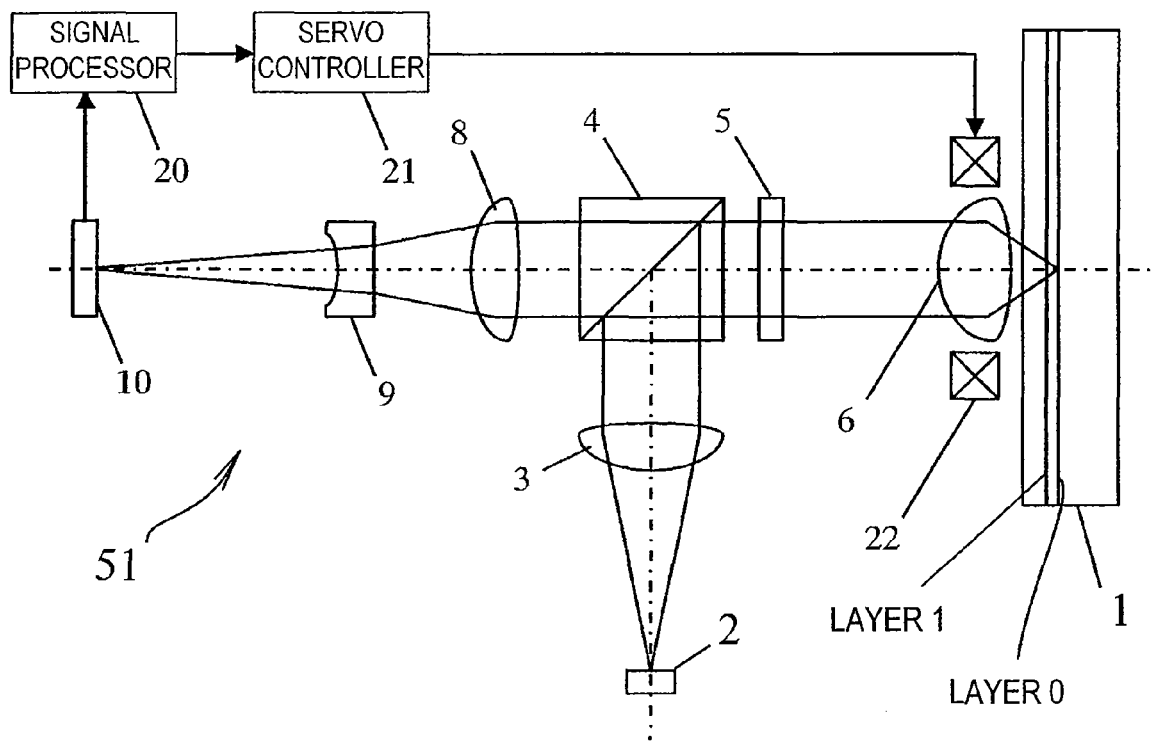
FIG. 2 shows a configuration for an optical disc drive 51 according to a first specific preferred embodiment of the present invention.

FIG. 2 shows a configuration for an optical disc drive 51 according to a first specific preferred embodiment of the present invention. The optical disc drive 51 reads and/or writes data from/on Layer 0 and/or Layer 1 by irradiating the optical disc 1 with light from under Layer 1.

The optical disc drive 51 preferably includes a semiconductor laser light source 2, a collimator lens 3, a beam splitter 4, a quarter wave plate 5, an objective lens 6, a detector lens 8, an anamorphic lens 9, a light detector 10, a signal processor 20, a servo controller 21 and an actuator coil 22. The optical disc 1 is normally removable and does not belong to the optical disc drive 51 but is shown in FIG. 2 for convenience sake. It should be noted that the optical disc drive 51 actually includes various other hardware components such as a spindle motor for rotating the optical disc 1, a modulator and demodulator for reading and/or writing data, and an error corrector. However, only main components of the optical disc drive 51, which are indispensable to carry out the present invention, are shown in FIG. 2.

The semiconductor laser light source 2 (which will be referred to herein just as a "light source 2") radiates a violet laser beam with a wavelength of 405 nm, for example. The collimator lens 3 transforms the incoming laser beam into a substantially parallel laser beam and then outputs it. The beam splitter 4 reflects almost all polarized components of the laser beam that has come from the collimator lens 3 and transmits almost all polarized component of the laser beam that has come from the quarter wave plate 5. The quarter wave plate 5 transforms an incoming circularly polarized light ray into a linearly polarized light ray, or vice versa. The objective lens 6 condenses the incoming light so as to form a focal spot on the target layer.

Figure 3:
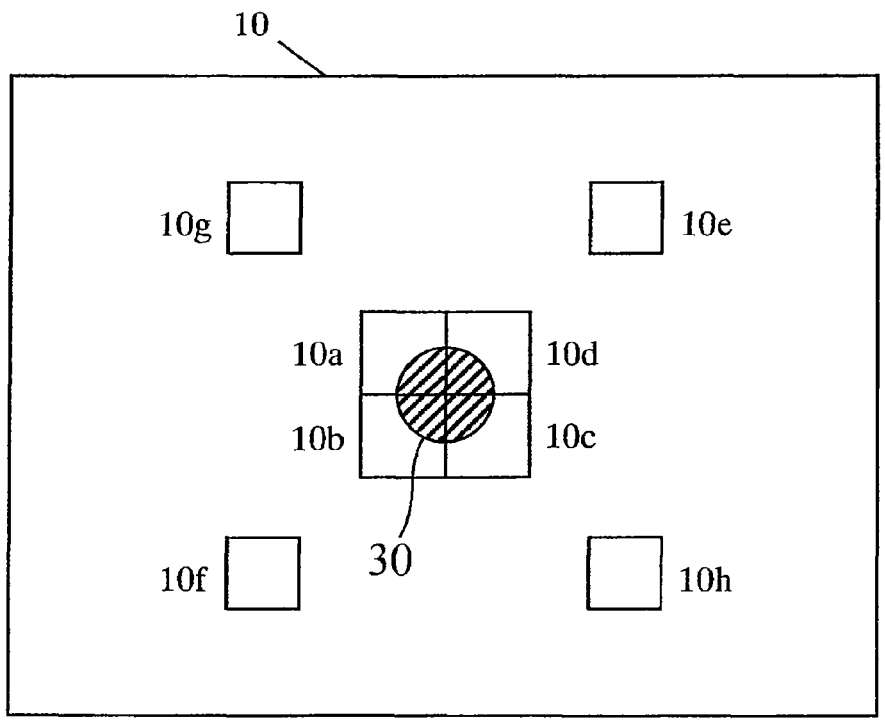
FIG. 3 shows an exemplary arrangement of photodetectors in the light detector 10 of the first preferred embodiment.

The detector lens 8 is provided to regulate the optical properties of the light that is going to enter the anamorphic lens 9. To perform a focus control operation by a known astigmatism method, the anamorphic lens 9 is designed so as to produce astigmatism by providing mutually different focal distances for two axes that cross each other at right angles. The light detector 10 includes at least one photodetector, which generates a light quantity signal representing the quantity of light received there. FIG. 3 shows an exemplary arrangement of photodetectors in the light detector 10 according to this preferred embodiment. The light detector 10 includes a plurality of photodetectors 10a through 10h. Among these photodetectors 10a through 10h, the first four photodetectors 10a, 10b, 10c and 10d (which are often called a "quadrant photodetector" as a set) receive a light beam 30 to generate a focus error signal. On the other hand, the four other photodetectors 10e, 10f, 10g and 10h are arranged at the four corners of the light detector 10 so as to surround the quadrant photodetector 10a through 10d, and receive a light beam to generate a layer sensing signal. The layer sensing signal is used to detect where (i.e., on or near what data storage layer) the focal spot is currently located. It should be noted that even a focal spot that is located exactly on a data storage layer may be referred to herein as being located "near" that data storage layer.

As will be described later, while an FE signal is being detected, the focal spot may be regarded as being located "near" the layer that is associated with the FE signal. Alternatively, if a focal spot falls within a range L in which a focus control operation can be carried out using the FE signal, then the focal spot may be regarded as being located "near" the layer that is associated with the FE signal. For example, in a two-layered BD, the "range L" is defined by two locations corresponding to the local minimum and maximum values of a focus error signal and has a width of approximately 1 to 5 µm. Also, even if the focal spot falls within a range L*, which is broader than the range L, the focal spot may also be regarded as being located "near" the layer. In a two-layered BD, the range L* has a width defined by ±5 µm from the layer, that is, a width of approximately 10 µm, in which the range L is included. Note that, in a two-layered BD, the gap between Layers 0 and 1 (i.e., gap between two locations corresponding to zero cross points of the focus error signal) may be 14 µm to 16 cm.

Referring back to FIG. 2, the signal processor 20 and/or servo controller 21 are semiconductor integrated circuits, which are programmed in advance so as to perform the control operation to be described later. The signal processor 20 generates a focus error signal and a layer sensing signal based on a light quantity signal supplied from the light detector 10. Also, in response to either the layer sensing signal or the layer sensing and focus error signals, the signal processor 20 determines whether the focal spot is located near Layer 0 of the optical disc 1 or near Layer 1 thereof. Furthermore, in performing the layer sensing process, the signal processor 20 further generates and outputs a control signal to change the position of the objective lens 6. Once located the focal spot, the signal processor 20 continuously generates the focus error signal and further generates and outputs a tracking error signal in order to perform normal data read and/or write operations. In response to these signals, the servo controller 21 generates a drive signal and applies it to the focus actuator coil 22 such that the light beam is not defocused from the desired layer. In accordance with the level of the drive signal, the actuator coil 22 changes the position of the objective lens 6 either perpendicularly or parallel to the optical disc 1.

In the optical disc drive 51, the collimator lens 3 and objective lens 6 together makes up a focusing optical system which forms a focal spot by focusing the light that has been radiated from the light source 2, while the objective lens 6, detector lens 8 and anamorphic lens 9 together makes up a detecting optical system which guides a light beam reflected from the optical disc 1 to the light detector 10. It should be noted that the beam splitter 4 and quarter wave plate 5 may be regarded as belonging to either the focusing optical system or the detecting optical system. An optical head is made up of the light source 2, focusing optical system, detecting optical system and light detector 10. If the signal processor 20 and servo controller 21 are provided within the optical head, then those circuits 20 and 21 form integral parts of the optical head. Alternatively, the signal processor 20 and servo controller 21 may also be implemented as an optical disc controller separately from the optical head. In that case, the optical disc drive is preferably designed such that the optical head performs an optical detection process to output a detection signal (i.e., the light quantity signal) and the optical disc controller processes the light quantity signal supplied from the optical head.

Hereinafter, it will be described how the optical disc drive 51 operates. First, a linearly polarized laser beam, emitted from the light source 2, is transformed into a substantially parallel light beam by the collimator lens 3. Thereafter, the laser beam is reflected from the beam splitter 4, transformed into a circularly polarized light beam by the quarter wave plate 5 and then focused by the objective lens 6 on either Layer 0 or Layer 1 of the optical disc 1, from/on which data should be read or written by way of the substrate (i.e., the protective coating).

Then, the focused laser beam is reflected from Layer 0 and Layer 1. More specifically, if the laser beam is focused on Layer 1, most of the laser beam is reflected from Layer 1 but a portion of the laser beam is transmitted to Layer 0 through Layer 1 and then reflected from Layer 0. A portion of the laser beam reaches as deep as Layer 0 because Layer 1 is designed so as to transmit the light such that data can be readily read from, and written on, Layer 0. On the other hand, if the laser beam is focused on Layer 0, most of the laser beam is reflected from Layer 0 but a portion of the laser beam is reflected from Layer 1. The laser beam that has been reflected from these layers is transmitted through the substrate of the optical disc 1 and objective lens 6 again, transformed by the quarter wave plate 5 into a different linearly polarized light beam from the previous one, and then transmitted through the beam splitter 4.

After having been transmitted through the beam splitter 4, the returning laser beam is incident onto the anamorphic lens 9 by way of the detector lens 8. The anamorphic lens 9 produces astigmatism to the incoming light by making the lateral magnifications of the first and second axes of the incoming light different from each other. As used herein, the "first and second axes" are defined as two axes that are perpendicular to the optical axis of the laser beam and that cross each other at right angles. Thus, the laser beam has two mutually different focal spots with respect to the first and second axes. The laser beam, which has left the anamorphic lens 9, enters the light detector 10. The laser beam with the astigmatism forms a focal spot ahead of the light detector 10 (on one side of the light detector 10 facing the objective lens 6) and another focal spot behind the light detector 10 (on the other side of the light detector 10 opposite from the anamorphic lens 9). In the following description, the axis of the laser beam, which is focused before the light detector 10, will be identified by the first axis, while the axis of the laser beam, which is focused behind the light detector 10, will be identified by the second axis. In the laser beam to which the astigmatism has been produced by the anamorphic lens 9, a light ray that was reflected from the layer on which the focal spot was located is controlled so as to form a substantially circular beam spot on the quadrant photodetector 10a through 10d shown in FIG. 3. Meanwhile, the first axis corresponds with the line that connects together the photodetectors 10g and 10h shown in FIG. 3, while the second axis corresponds with the line that connects together the photodetectors 10e and 10f shown in FIG. 3.

The light detector 10 has its photodetectors detect the laser beam received, thereby generating light quantity signals representing the quantities of the light received. Then, the signal processor 20 performs computations based on the levels of those light quantity signals, thereby generating the layer sensing signal. Also, the signal processor 20 further generates error signals such as a focus error signal and a tracking error signal and a data signal representing the data. Furthermore, the signal processor 20 determines, by the level of the layer sensing signal at least, whether the focal spot of the laser beam is now located near Layer 0 of the optical disc loaded or near Layer 1 thereof. In accordance with the error signals, the servo controller 21 supplies current to the actuator coil 22, thereby driving the objective lens 6 in focus and tracking directions. As a result, the focal spot being formed by the objective lens 6 on Layer 0 or 1 of the optical disc 1 can follow the data tracks.

In this case, according to the astigmatism method, the focus error signal FE is given by $FE$=(output light quantity signal of photodetector 10a)+(output light quantity signal of photodetector 10c)−(output light quantity signal of photodetector 10b)−(output light quantity signal of photodetector 10d)

On the other hand, according to a push-pull method, for example, the tracking error signal TE is given by $TE$=(output light quantity signal of photodetector 10a)+(output light quantity signal of photodetector 10d)−(output light quantity signal of photodetector 10b)−(output light quantity signal of photodetector 10c)

Hereinafter, it will be described how to perform the layer sensing process according to this preferred embodiment. The layer sensing process of this preferred embodiment is done for the purpose of sensing Layer 0. This is because when the optical disc 1 is loaded into the optical disc drive 51, Layer 0 must be located to read data from the TOC area of the optical disc 1 as shown in FIG. 1D. According to the layer sensing technique to be described below, however, not only Layer 0 but also Layer 1 can be sensed as well.

Figure 4:
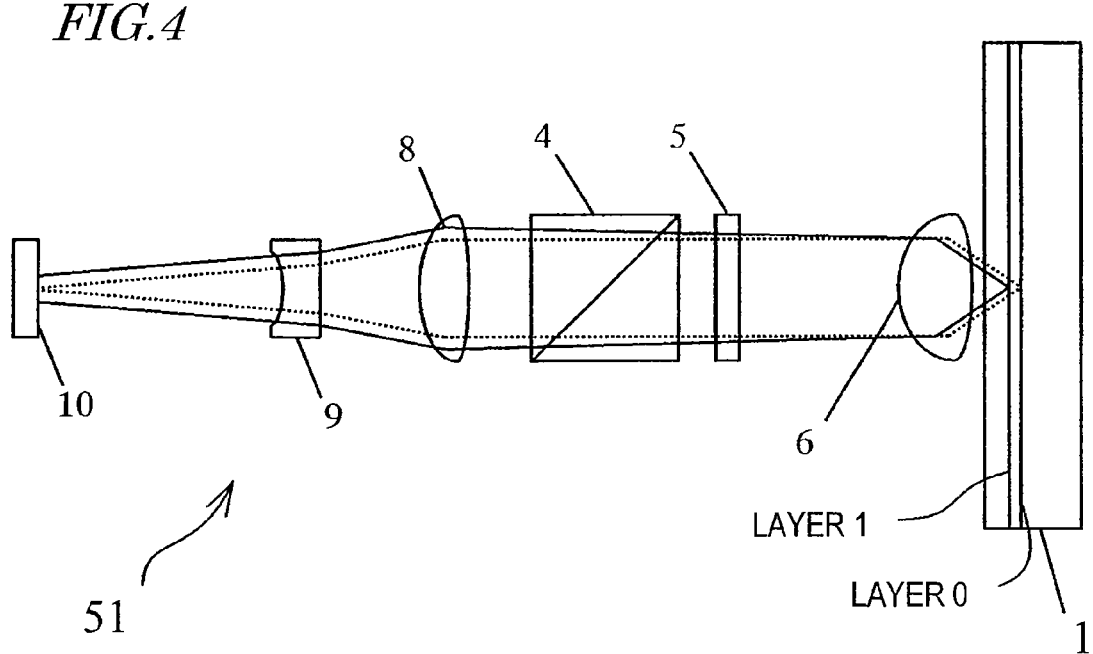
FIG. 4 shows where the light reflected from Layer 0 passes (by the dotted lines) and where the light reflected from Layer 1 passes (by the solid lines) when the focal spot is located on or near Layer 0.

FIG. 4 shows where the light reflected from Layer 0 passes (by the dotted lines) and where the light reflected from Layer 1 passes (by the solid lines) when the focal spot is located near Layer 0. For the sake of simplicity, the light source 1, collimator lens 3 and optical path of the light entering the optical disc 1 are omitted. In this case, the data storage layer to read data from and write data on is Layer 0.

If the focal spot formed by the objective lens 6 is located near Layer 0 of the optical disc 1, then the light reflected from Layer 0 passes the dotted optical path, is given astigmatism by the anamorphic lens 9 and then enters the light detector 10. In this case, the reflected light is focused on the light detector 10. Since the astigmatism is produced by the anamorphic lens 9 to the light reflected from Layer 0, the reflected light actually forms two different focal spots along the first and second axes, respectively. Accordingly, strictly speaking, the focal spot of the reflected light is not one. However, if the entire reflected light is incident on the quadrant photodetector 10a through 10d and if the distances from the respective focal spots to the quadrant photodetector are substantially equal to each other, then the reflected light is regarded herein as being "focused" or "converged" on the quadrant photodetector 10a through 10d.

On the other hand, the light reflected from Layer 1 (i.e., stray light) passes the solid optical path, is given the astigmatism by the anamorphic lens 9 and then enters the light detector 10. This reflected light enters the light detector 10 while being more expanded than the light reflected from Layer 0.

Figure 5:
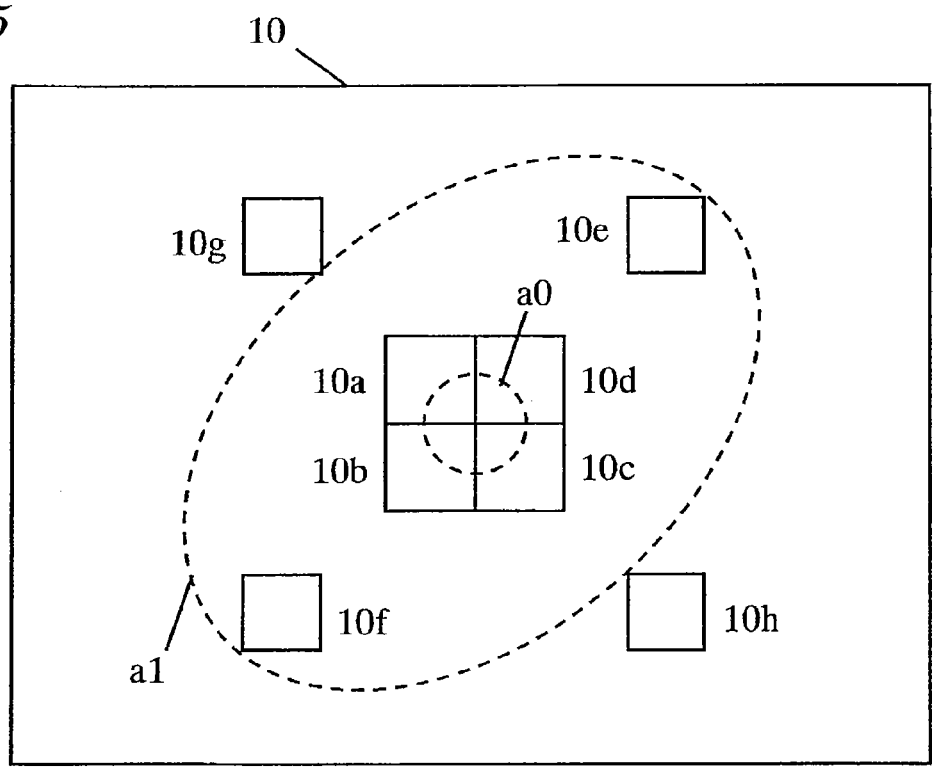
FIG. 5 shows the beam spot shapes of the respective reflected light beams entering the light detector 10 when the focal spot of the laser beam is located near Layer 0 of the optical disc 1.

FIG. 5 shows the beam spot shapes of the respective reflected light beams entering the light detector 10 when the focal spot of the laser beam is located near Layer 0 of the optical disc 1. A beam spot a0 is formed on the quadrant photodetector 10a through 10d of the light detector 10 by the light that has been reflected from Layer 0. At the same time, another bigger elliptical beam spot a1 with a lower intensity is formed by the light that has been reflected from Layer 1 (i.e., the stray light). It should be noted that the stray light with the elliptical beam spot a1 is received almost equally at the photodetectors 10e and 10f, which are arranged along the second axis, but hardly enters any of the photodetectors 10g and 10h that are arranged along the first axis. In other words, the photodetectors 10g and 10h are arranged along the first axis in respective regions that the light reflected from Layer 1 does not reach when the focal spot is located near Layer 0 of the optical disc 1.

Figure 6:
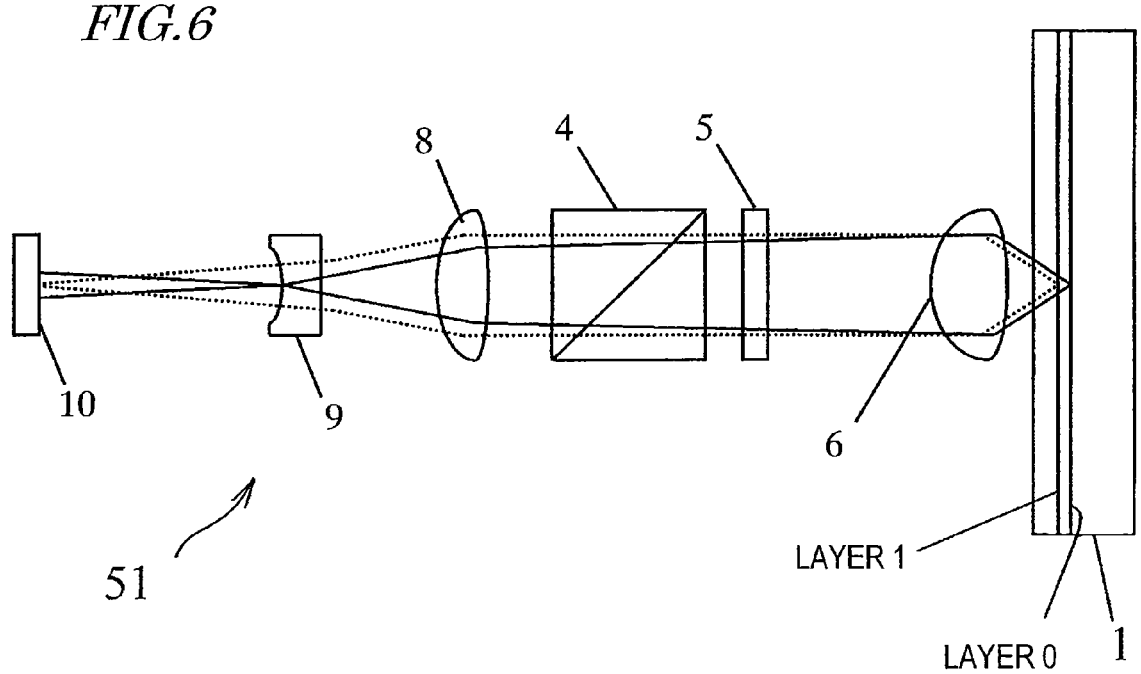
FIG. 6 shows where the light reflected from Layer 0 passes (by the solid lines) and where the light reflected from Layer 1 passes (by the dotted lines) when the focal spot is located on or near Layer 1.

FIG. 6 shows where the light reflected from Layer 0 passes (by the solid lines) and where the light reflected from Layer 1 passes (by the dotted lines) when the focal spot is located near Layer 1.

If the focal spot formed by the objective lens 6 is located near Layer 1 of the optical disc 1, then the light reflected from Layer 1 passes the dotted optical path, is given astigmatism by the anamorphic lens 9 and then enters the light detector 10. In this case, the light reflected from Layer 1 (as indicated by the dotted lines) is focused on the light detector 10.

On the other hand, the laser beam reflected from Layer 0 (i.e., stray light) passes the solid optical path, is converged near the anamorphic lens 9 and then enters the light detector 10. The light reflected from Layer 0 (as indicated by the solid lines) enters the light detector 10 while being more expanded than the light reflected from Layer 1.

Figure 7:
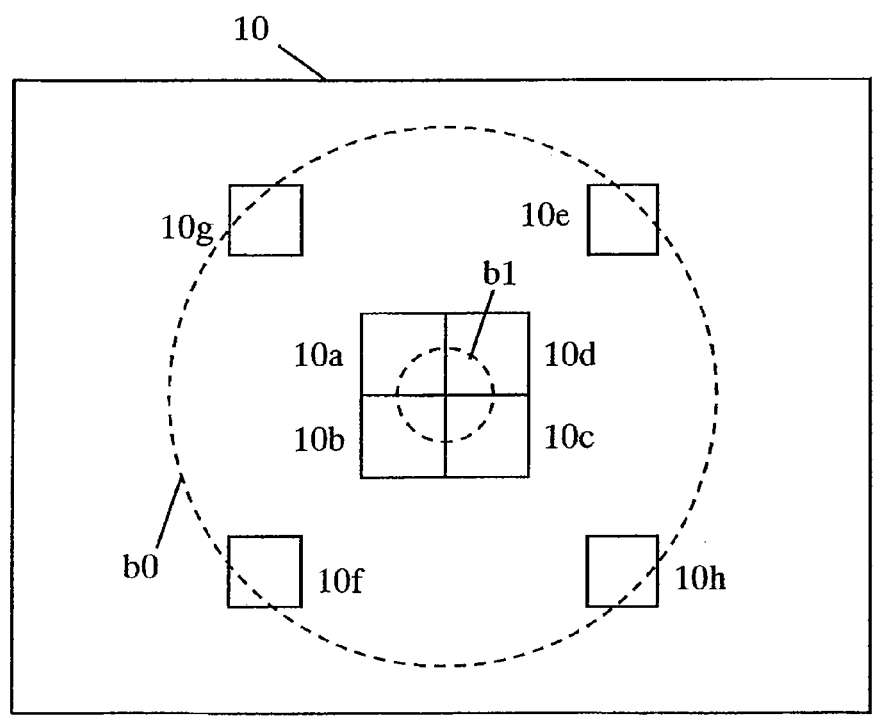
FIG. 7 shows the beam spot shapes of the respective reflected light beams entering the light detector 10 when the focal spot of the laser beam is located near Layer 1 of the optical disc 1.

FIG. 7 shows the beam spot shapes of the respective reflected light beams entering the light detector 10 when the focal spot of the laser beam is located near Layer 1 of the optical disc 1. A beam spot b1 is formed on the quadrant photodetector 10a through 10d of the light detector 10 by the laser beam that has been reflected from Layer 1. At the same time, another bigger beam spot b0 with a lower intensity is formed by the laser beam that has been reflected from Layer 0 (i.e., the stray light). The beam spot b0 is circular, not elliptical unlike the beam spot a1 shown in FIG. 5 because the light reflected from Layer 0 is given almost no astigmatism by the anamorphic lens 9. That is why the substantially circular beam spot b0 is formed on the light detector 10. In this case, the photodetectors 10e, 10f, 10g and 10h receive substantially equal quantities of laser beam.

As already described with reference to FIG. 5, when the focal spot is located near Layer 0, the elliptical beam spot a1 is formed on the light detector 10 by the light that has been reflected from Layer 1. In that case, neither the photodetector 10g nor photodetector 10h substantially detects the light with the beam spot a1. On the other hand, when the focal spot is located near Layer 1, the circular beam spot b0 is formed on the light detector 10 by the light that has been reflected from Layer 0 as shown in FIG. 7. In that case, both of the photodetectors 10g and 10h detect the light with the beam spot b0. In this manner, the arrangement of the photodetectors 10g and 10h is determined while considering where the light reflected from the other layer, not the layer on which the focal spot is currently located, is incident (or what beam spot shape the incident light forms). As will be described later, light quantity signals need to be supplied from the photodetectors 10g and 10h to generate a layer sensing signal. That is to say, the photodetectors 10g and 10h are used for layer sensing purposes, and therefore, will be sometimes referred to herein as "layer sensing photodetectors".

It should be noted that the arrangement of the photodetectors 10g and 10h may be determined under ideal conditions before the optical disc drive 51 is shipped. In that case, when the user loads a new optical disc into the optical disc drive 51 after that, the optical disc drive 51 can perform a layer sensing process in accordance with the unique property of that particular optical disc, for example.

Using the photodetectors arranged in this way, the signal processor 20 obtains the layer sensing signal RD as follows:

RD=(output light quantity signal of photodetector 10e)+(output light quantity signal of photodetector 10f)−(output light quantity signal of photodetector 10g)−(output light quantity signal of photodetector 10h)

In the example illustrated in FIG. 5, the output light quantity signals of the photodetectors 10g and 10h are substantially equal to zero. On the other hand, in the example illustrated in FIG. 7, the output light quantity signals of the photodetectors 10g and 10h are positive (i.e., greater than zero). Accordingly, considering the quantities of light received at these photodetectors 10e, 10f, 10g and 10h, the layer sensing signal RD has a positive level in the example illustrated in FIG. 5 and a substantially zero level in the example illustrated in FIG. 7, respectively.

Figure 8:
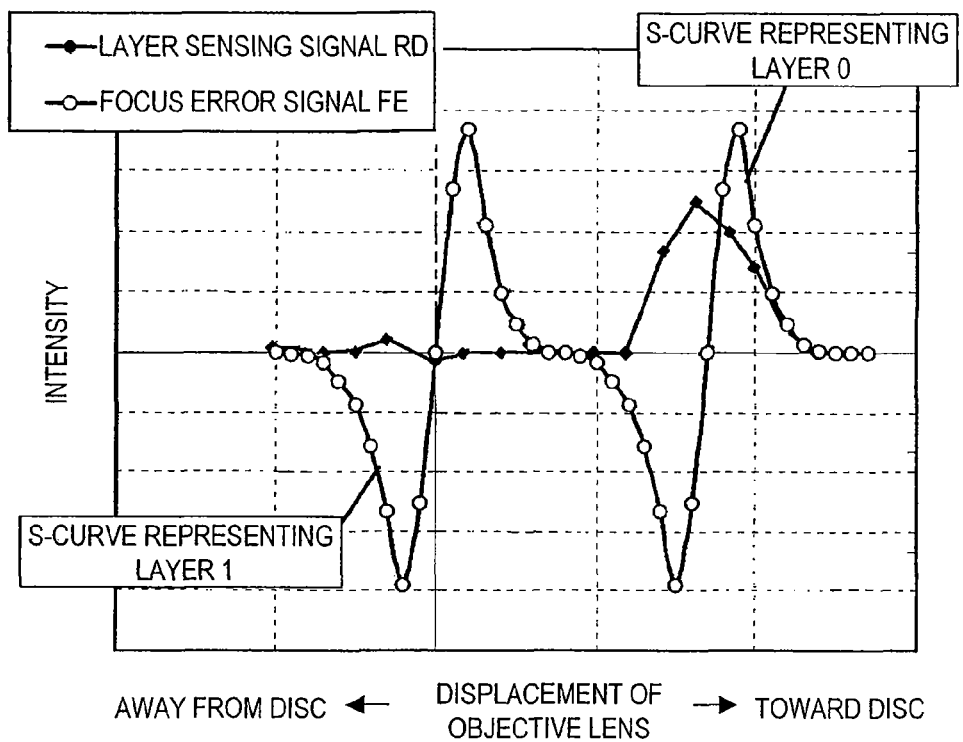
FIG. 8 is a graph showing how the levels of the focus error signal FE and layer sensing signal RD (ordinates) change with the shift of the objective lens 6 (abscissa)

FIG. 8 shows how the levels of the focus error signal FE and layer sensing signal RD (ordinates) change with the shift of the objective lens 6 (abscissa).

As the objective lens 6 is shifted, the light beam is converged such that the focal spot gets closer to each data storage layer and then leaves the layer. As a result, the focus error signal FE comes to have a so-called "S-curve" representing such shifting of the focal spot. In such an S-curve, the zero cross point of the focus error signal FE corresponds to the focal spot on each layer.

As the objective lens 6 is approaching the optical disc 1 from a position far away from the optical disc 1, the waveform of the focus error signal FE comes to have an S-curve representing Layer 1 first, and then another S-curve representing Layer 0 under ideal conditions. However, if the optical disc 1 was rotating with some flutter, then it would be difficult to tell exactly which of the two layers the given S-curve has come from.

Thus, the layer sensing signal RD is used according to this preferred embodiment. If the focal spot is located near Layer 0 (i.e., in the situation shown in FIGS. 4 and 5), the layer sensing signal RD is positive. On the other hand, if the focal spot is located near Layer 1 (i.e., in the situation shown in FIGS. 6 and 7), the layer sensing signal RD is almost equal to zero. In the vicinity of each zero cross point of the focus error signal FE, the focal spot is located near either Layer 0 or Layer 1. Accordingly, if the layer sensing signal RD has a positive level near a zero cross point of the focus error signal FE, then the signal processor 20 may judge that the focal spot is located near Layer 0. On the other hand, if the layer sensing signal RD has a substantially zero level near the zero cross point of the focus error signal FE, then the signal processor 20 may judge that the focal spot is located near Layer 1. By comparing the focus error signal FE and layer sensing signal RD, the signal processor 20 can easily determine which of the two layers the S-curve appearing in the waveform of the focus error signal FE has come from. Also, by using the layer sensing signal RD, a layer to be subject to a focus control can be sensed even before the focus control is started. Thus, the time it takes for an optical disc drive started (i.e., in a so-called "standby state") to get ready for an actual read or write operation can be shortened significantly.

The above method of figuring out the layer sensing signal RD is just an example. Alternatively, the layer sensing signal RD may also be normalized as Ra/Rb where $Ra$=(output light quantity signal of photodetector 10$e$)+(output light quantity signal of photodetector 10$f$)−(output light quantity signal of photodetector 10$g$)−(output light quantity signal of photodetector 10$h$) and $Rb$=(output light quantity signal of photodetector 10$e$)+(output light quantity signal of photodetector 10$f$)+(output light quantity signal of photodetector 10$g$)+(output light quantity signal of photodetector 10$h$)

In this manner, by normalizing the layer sensing signal RD with the sum of the quantities of light received at the respective photodetectors, the layer sensing signal RD can be obtained with good stability without being affected by an offset resulting from a variation in the reflectance of the optical disc 1.

As another alternative, the layer sensing signal RD may also be given by $RD$=(output light quantity signal of photodetector 10$g$)+(output light quantity signal of photodetector 10$h$)

Figure 9:
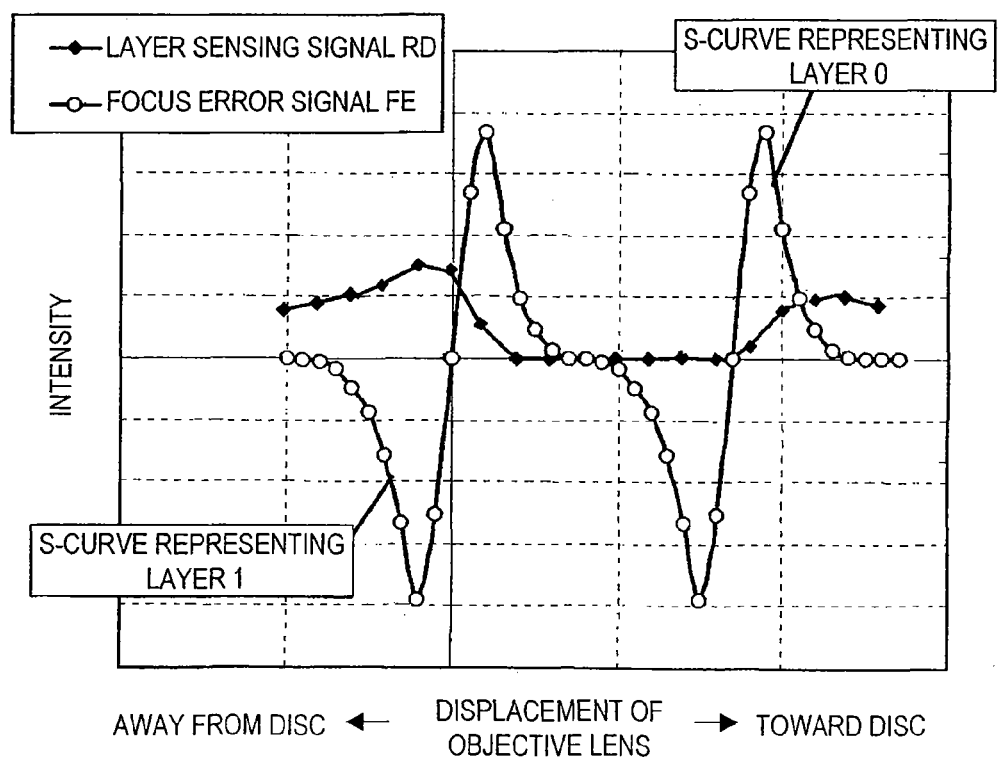
FIG. 9 is a graph showing the waveform of a layer sensing signal RD that is based on only the quantities of light received at the photodetectors 10g and 10h.

FIG. 9 shows the waveform of such a layer sensing signal RD that is based on only the quantities of light received at the photodetectors 10$g$ and 10$h$. In FIG. 9, if the focal spot is located near Layer 0 (i.e., in the situation shown in FIGS. 4 and 5), the layer sensing signal RD is also positive. On the other hand, if the focal spot is located near Layer 1 (i.e., in the situation shown in FIGS. 6 and 7), the layer sensing signal RD is almost equal to zero, too. Thus, by taking the focus error signal FE and layer sensing signal RD into consideration in combination, it is possible to easily determine which of the two layers the S-curve appearing in the waveform of the focus error signal FE has come from.

In the layer sensing process described above, the layer sensing signal is generated based on the light reflected from the non-selected layer, i.e., not the layer on which the focal spot is currently formed by the objective lens 6. The beam spot of the reflected light on the light detector 10 changes its shape according to the specific location of the focal spot. Accordingly, by taking not only the layer sensing signal but also the focus error signal into consideration, the layer on which the focal spot is currently formed by the objective lens 6 can be sensed just as intended. The light reflected from that layer is intense enough to detect. Consequently, the layer sensing signal can be generated at a high SNR.

In the layer sensing process described above, there is no need to use any sub-beams unlike the conventional three-beam method. Thus, the layer sensing process of this preferred embodiment is applicable for use in an optical head that adopts a one-beam method. Optionally, the technique described above may be applied to the three-beam method as well.

Embodiment 2

Figure 10:
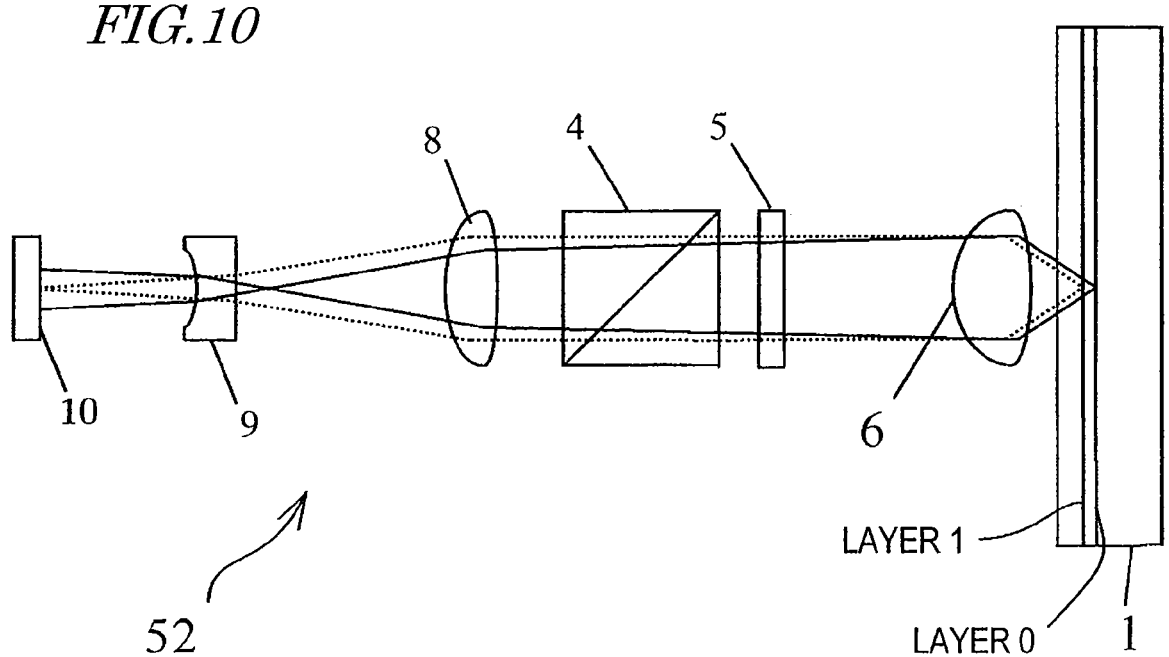
FIG. 10 shows a configuration for an optical disc drive 52 according to a second specific preferred embodiment of the present invention.

FIG. 10 illustrates a configuration for an optical disc drive 52 according to a second specific preferred embodiment of the present invention. The optical disc drive 52 basically has the same components as the optical disc drive 51 shown in FIG. 2. However, as in FIG. 4, the illustration of some of those components is omitted from FIG. 10. Also, as in the first preferred embodiment described above, an optical head is made up of the light source, focusing optical system, detecting optical system and light detector.

Unlike the optical disc drive 51 of the first preferred embodiment described above, the optical disc drive 52 of this second preferred embodiment is designed such that when the focal spot of the laser beam is located near Layer 1, the light reflected from Layer 0 is focused before entering the anamorphic lens 9. This design is adopted such that astigmatism is produced in mutually different directions in the light reflected from Layer 1 when the focal spot is located near Layer 0 and in the light reflected from Layer 0 when the focal spot is located near Layer 1 and that those two reflected light beams are incident on two different areas of the light detector 10. However, as in the first preferred embodiment described above, it is just necessary to make a difference between the two incident areas. Thus, the two reflected light beams do not have to enter two totally different areas.

Hereinafter, the optical disc drive 52 of this second preferred embodiment will be described in detail. It should be noted that if any component of the optical disc drive 52 of the second preferred embodiment has the same function and configuration as the counterpart of the optical disc drive 51 of the first preferred embodiment, the description thereof will be omitted herein.

The detector lens 8 of this preferred embodiment has a longer focal distance than the counterpart of the first preferred embodiment described above. Accordingly, the gap between the focal spot of the light reflected from Layer 0 and that of the light reflected from Layer 1 widens. Specifically, when the focal spot is located on Layer 1, the light reflected from Layer 1 is controlled so as to be converged on the light detector 10. Accordingly, the light reflected from the other Layer 0 is focused even closer to the detector lens 8. Thus, by controlling the focal distance of the detector lens 8 and/or bringing the anamorphic lens 9 closer to the light detector 10, the light reflected from Layer 0 can be focused even before entering the anamorphic lens 9. On the other hand, the anamorphic lens 9 of this second preferred embodiment needs to produce as great astigmatism as that produced by the anamorphic lens of the first preferred embodiment for the incoming light by providing stronger refractive power for the anamorphic lens.

As used herein, the "refractive power" of a lens refers to an optical property that forms a focal spot even closer to the lens. The refractive power of a lens can be increased by either increasing the refractive index of the lens or decreasing the radius of curvature thereof.

Figure 11:
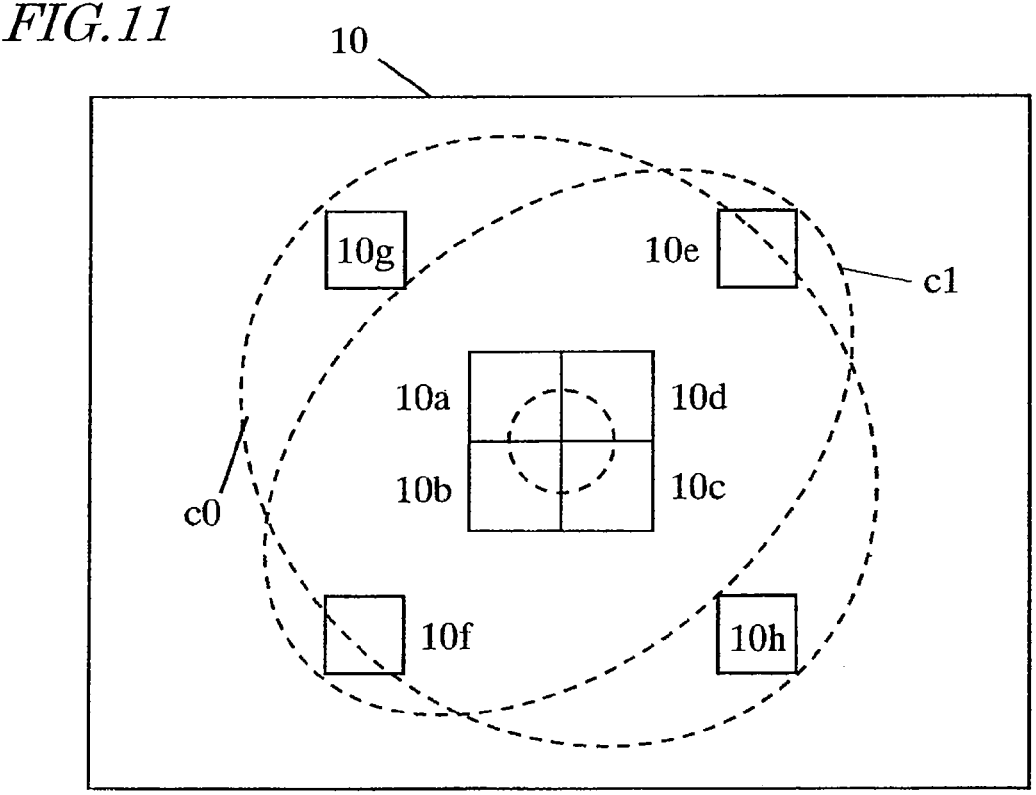
FIG. 11 shows the beam spot shapes of the respective reflected light beams entering the light detector 10.

FIG. 11 shows the beam spot shapes of the respective reflected light beams entering the light detector 10. When the focal spot formed by the objective lens 6 is located near Layer 1, the light reflected from Layer 0 forms a beam spot c0. On the other hand, when the focal spot is located near Layer 0, the light reflected from Layer 1 forms a beam spot c1. In accordance with the astigmatism produced by the anamorphic lens 9, each of the beam spots c0 and c1 has an elliptical shape of which the major and minor axes cross each other at right angles.

In this case, the layer sensing signal RD is given by

RD=(output light quantity signal of photodetector 10e)+(output light quantity signal of photodetector 10f)−(output light quantity signal of photodetector 10g)−(output light quantity signal of photodetector 10h)

The sign of the layer sensing signal RD inverts when the reflected light is converged near Layer 1 or Layer 0. As in the first preferred embodiment described above, by comparing the focus error signal FE with the layer sensing signal RD, it is possible to easily determine which of the two layers the S-curve appearing in the waveform of the focus error signal FE has come from.

As described above, the optical disc drive of this preferred embodiment is designed such that when the focal spot is located near Layer 1, the light reflected from the other Layer 0 is converged by the detector lens 8 before entering the anamorphic lens 9. As a result, the detection sensitivity can be increased.

Suppose the light reflected from Layer 0 was allowed to converge after having been transmitted through the anamorphic lens 9 without using such a detector lens 8. In such an arrangement, two reflected light beams, having the same elliptical beam spot shapes of which the major axes point the same direction and the minor axes point the same direction due to the astigmatism produced by the anamorphic lens 9, would enter the light detector 10. In that case, the layer sensing process could not be carried out just as intended by using the output light quantity signals of the layer sensing photodetectors 10g and 10h. Even so, the layer sensing process could still be carried out appropriately by making the signal processor 20 adopt the following sensing method.

Specifically, in that case, the layer sensing signal RD should be obtained as a normalized layer sensing signal RD=Ra/Rb where Ra=(output light quantity signal of photodetector 10e)+(output light quantity signal of photodetector 10f)−(output light quantity signal of photodetector 10g)−(output light quantity signal of photodetector 10h) and Rb=(output light quantity signal of photodetector 10e)+(output light quantity signal of photodetector 10f)+(output light quantity signal of photodetector 10g)+(output light quantity signal of photodetector 10h)

By using such a normalized layer sensing signal RD, the probability of erroneous detection can be reduced. In this case, the light entering the photodetectors 10g and 10h when the focal spot is located near Layer 0 is different from the light entering the same photodetectors 10g and 10h when the focal spot is located near Layer 1. Accordingly, the layer sensing signal RD also has two different levels in the two situations.

For example, the layer sensing signal RD may have a higher level when the focal spot is located near Layer 0 than when the focal spot is located near Layer 1. Thus, a threshold value is defined between the level of the layer sensing signal RD when the focal spot is located near Layer 0 and that of the layer sensing signal RD when the focal spot is located near Layer 1. In that case, if the layer sensing signal RD has a level that is equal to or greater than the threshold value in the vicinity of a zero cross point of the focus error signal FE, then the signal processor 20 may judge that the focal spot is located near Layer 0. On the other hand, if the layer sensing signal RD has a level that is less than the threshold value in the vicinity of the zero cross point of the focus error signal FE, then the signal processor 20 may judge that the focal spot is located near Layer 1. Even so, by comparing the focus error signal FE and layer sensing signal RD, the signal processor 20 can also easily determine which of the two layers the S-curve appearing in the waveform of the focus error signal FE has come from.

In the first and second preferred embodiments of the present invention described above, the tracking error signal is supposed to be detected by a push-pull method. However, the present invention is in no way limited to those specific preferred embodiments. Alternatively, the present invention is also applicable to any other tracking error signal detecting method as long as the detecting method can be combined with the astigmatism method that is adopted herein to detect the focus error signal.

Also, even if the given optical disc has three or more layers as shown in FIG. 1C, it is also possible to find the layer, on which the focal spot formed by the objective lens is currently located, by sensing the difference in beam spot shape between the laser beams reflected from the respective layers as a difference in light quantity in accordance with the astigmatism produced by the anamorphic lens.

Embodiment 3

Figure 12A:
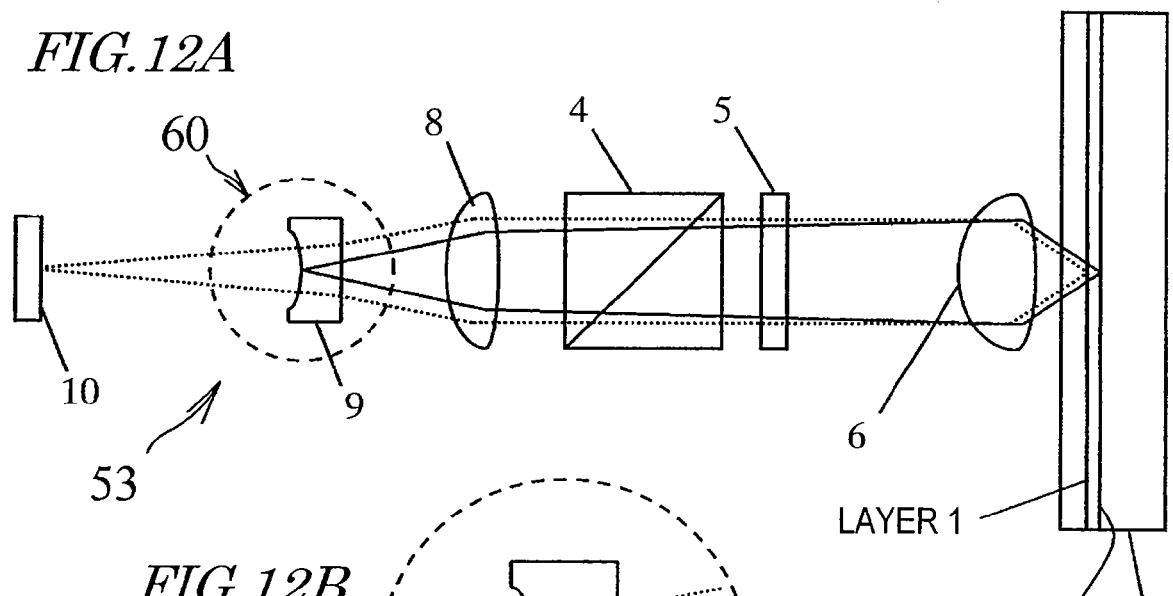
FIG. 12A shows a configuration for an optical disc drive 53 according to a third specific preferred embodiment of the present invention.
Figure 12B:
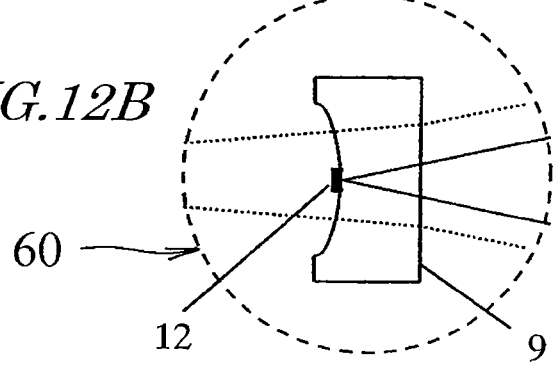
FIG. 12B shows a surrounding portion 60 of the anamorphic lens 9 on a larger scale.

FIG. 12A illustrates a configuration for an optical disc drive 53 according to a third specific preferred embodiment of the present invention. FIG. 12B illustrates the anamorphic lens 9 and its surrounding portion 60 on a larger scale. The optical disc drive 53 basically has the same components as the optical disc drive 51 shown in FIG. 2. However, as in FIG. 4, the illustration of some of those components is omitted from FIG. 12A. Also, as in the first preferred embodiment described above, an optical head is made up of the light source, focusing optical system, detecting optical system and light detector.

In the optical disc drive 53 of this preferred embodiment, an opaque region 12 is provided on the anamorphic lens 9 so as to cut off a portion of the light being transmitted through the anamorphic lens 9 as shown in FIG. 12B. Also, the optical disc drive 53 is designed such that when the focal spot is located near Layer 1, the light reflected from Layer 0 is substantially focused on the anamorphic lens 9 (i.e., in the vicinity of the opaque region) by the detector lens 8 and the anamorphic lens 9. This arrangement is adopted in this preferred embodiment to prevent the light reflected from Layer 0 from entering the light detector by converging the light in the vicinity of the opaque region. It should be noted that the opaque region 12 has a minimum required size to cut off the light reflected from Layer 0 when the focal spot is located near Layer 1.

Hereinafter, the optical disc drive 53 of this third preferred embodiment will be described in detail. It should be noted that if any component of the optical disc drive 53 of the third preferred embodiment has the same function and configuration as the counterpart of the optical disc drive 51 of the first preferred embodiment, the description thereof will be omitted herein.

Figure 13:
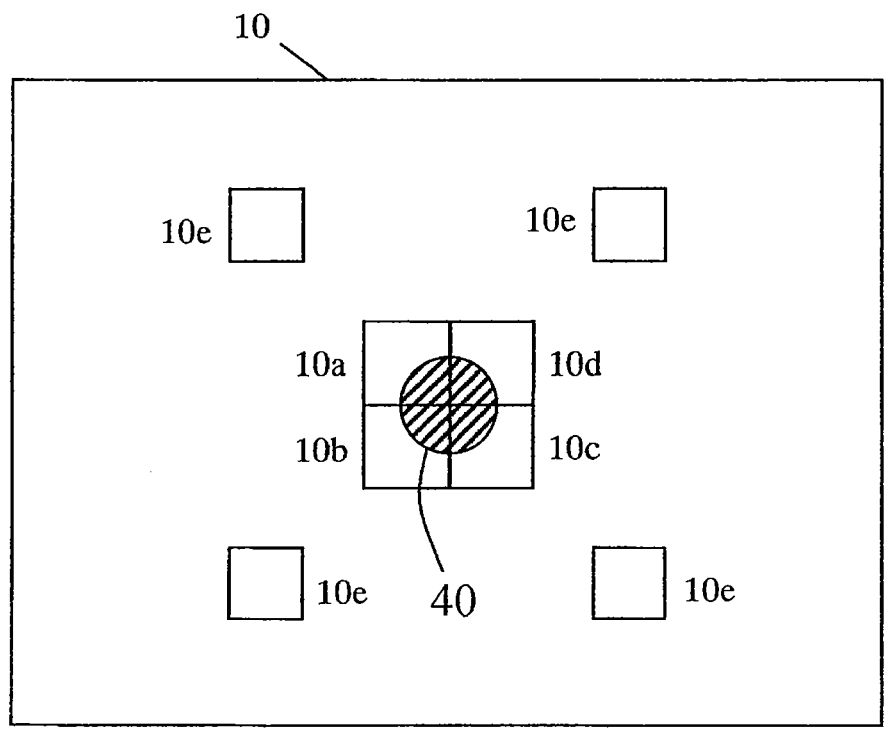
FIG. 13 shows an exemplary arrangement of photodetectors 10e in the light detector 10 of the third preferred embodiment.

FIG. 13 illustrates an arrangement of photodetectors 10e in the light detector 10 of this preferred embodiment. As shown in FIG. 13, the light detector 10 includes a quadrant photodetector 10a through 10d and four other photodetectors 10e. The quadrant photodetector 10a through 10d receives light to generate a focus error signal. The photodetectors 10e are arranged around the four corners of the quadrant photodetector 10a through 10d so as to receive light to generate a layer sensing signal. That is to say, the photodetectors 10e are layer sensing photodetectors. The laser beam in which astigmatism has been produced by the anamorphic lens 9 is controlled so as to form a substantially circular beam spot on the quadrant photodetector 10a through 10e. A beam cross section 40 on the quadrant photodetector 10a through 10d is illustrated in FIG. 3 for reference.

Figure 14:
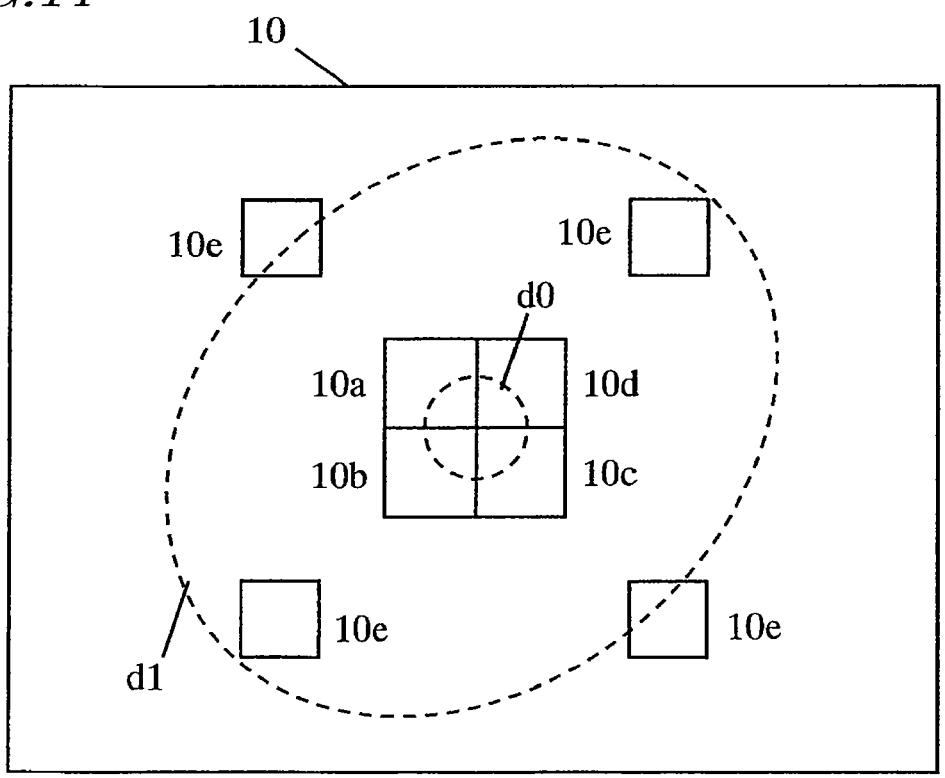
FIG. 14 shows the beam spot shapes of the respective reflected light beams entering the light detector 10 when the focal spot of the laser beam is located near Layer 0 of the optical disc 1.

FIG. 14 shows the beam spot shapes of the respective reflected light beams entering the light detector 10 when the focal spot of the laser beam is located near Layer 0 of the optical disc 1. A beam spot d0 is formed on the quadrant photodetector 10a through 10d of the light detector 10 by the light that has been reflected from Layer 0. At the same time, another bigger elliptical beam spot d1 with a lower intensity is formed by the light that has been reflected from Layer 1. It should be noted that the laser beam reflected from Layer 1 substantially passes the solid optical path shown in FIG. 4 and is given astigmatism by the anamorphic lens 9.

On the other hand, FIG. 15 shows the beam spot shape of a reflected light beam entering the light detector 10 when the focal spot of the laser beam is located near Layer 1 of the optical disc 1. A beam spot e1 is formed on the quadrant photodetector 10a through 10d of the light detector 10 by the light that has been reflected from Layer 1. However, the laser beam that has been reflected from Layer 0 never reaches the light detector 10. This is because the laser beam reflected from Layer 0 has been almost completely converged on the anamorphic lens 9, which is provided with the opaque region 12, and cut off by the opaque region 12. Accordingly, only the beam spot e1 is formed on the light detector 10 by the light reflected from Layer 1. It should be noted that by providing the opaque region 12, not only this beam spot e1 but also the beam spots d0 and d1 when the focal spot of the laser beam is located near Layer 1 of the optical disc 1 are partially shielded from light. However, no significant effects are produced from the viewpoint of light quantity detection.

In this preferred embodiment, the layer sensing signal RD is obtained as

RD=(output light quantity signal of photodetector(s) 10e)

In this case, the "light quantity signal" may be either the sum of the light quantity signals output from the four photodetectors 10e or the light quantity signal output from just one of the four photodetectors 10e.

When the focal spot is located near Layer 0 (i.e., in the situation shown in FIG. 14), the light reflected from Layer 1 forms the beam spot d1 spreading over the photodetectors 10d, and therefore, the layer sensing signal RD has a predetermined value. However, when the focal spot is located near Layer 1 (i.e., in the situation shown in FIG. 15), the layer sensing signal RD becomes substantially equal to zero. Consequently, as in the first preferred embodiment described above, if the layer sensing signal RD has a positive level near a zero cross point of the focus error signal FE, then the signal processor 20 may judge that the focal spot is located near Layer 0. On the other hand, if the layer sensing signal RD has a substantially zero level near the zero cross point of the focus error signal FE, then the signal processor 20 may judge that the focal spot is located near Layer 1.

Embodiment 4

FIG. 16A illustrates a configuration for an optical disc drive 54 according to a fourth specific preferred embodiment of the present invention. FIG. 16B illustrates the anamorphic lens 9 and its surrounding portion 70 on a larger scale. The optical disc drive 54 basically has the same components as the optical disc drive 51 shown in FIG. 2. However, as in FIG. 4, the illustration of some of those components is omitted from FIG. 16A. Also, as in the first preferred embodiment described above, an optical head is made up of the light source, focusing optical system, detecting optical system and light detector.

The optical disc drive 53 of this preferred embodiment includes a ring like aperture 13 on the anamorphic lens 9 so as to cut off a portion of the light being transmitted through the anamorphic lens 9 as shown in FIG. 16B. Also, the optical disc drive 53 is designed such that when the focal spot is located near Layer 0, the edge portion of the light reflected from Layer 1 is cut off by the aperture 13. The edge portion of the light reflected from Layer 1 is cut off so as to decrease the cross section of the light beam entering the light detector 10. Thus, on the light detector 10, the cross section of the light beam reflected from Layer 0 when the focal spot is located near Layer 1 can be different from that of the light beam reflected from Layer 1 when the focal spot is located near Layer 0. As a result, the layer sensing process can be carried out based on the difference as in the first through third preferred embodiments described above.

Figure 17:
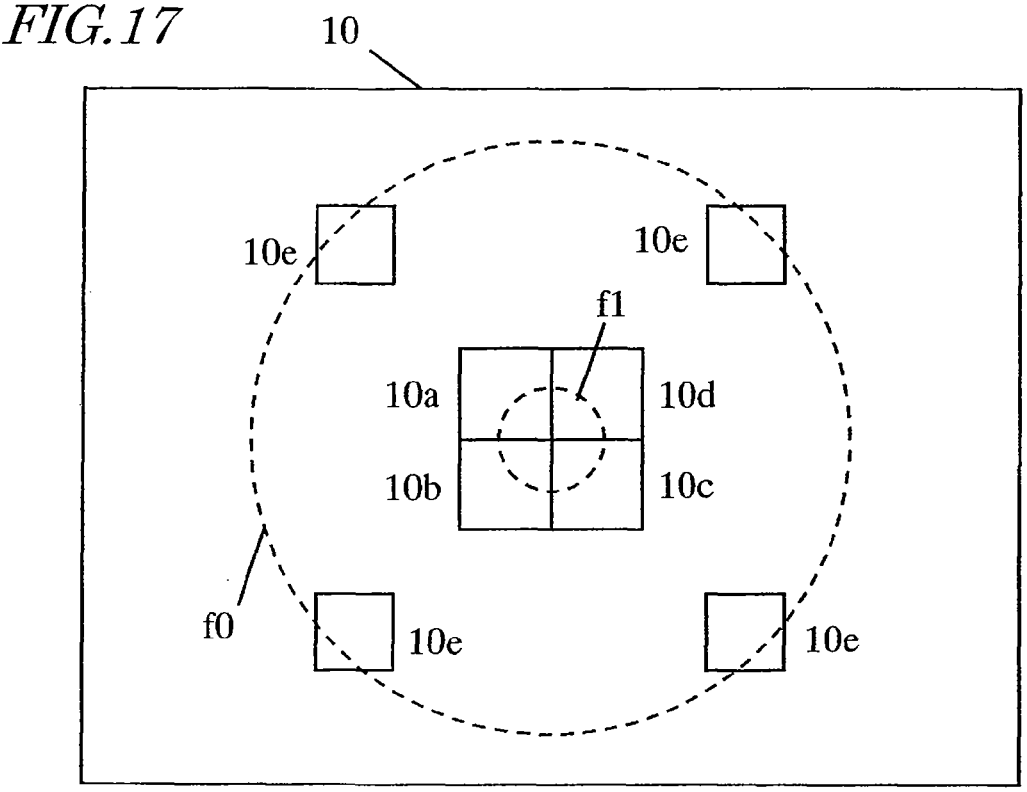
FIG. 17 shows the beam spot shapes of the respective reflected light beams entering the light detector 10 when the focal spot of the laser beam is located near Layer 1 of the optical disc 1.

FIG. 17 shows the beam spot shapes of the respective reflected light beams entering the light detector 10 when the focal spot of the laser beam is located near Layer 1 of the optical disc 1. In this fourth preferred embodiment, the respective photodetectors of the light detector 10 are arranged as in the third preferred embodiments described above. A beam spot f1 is formed on the quadrant photodetector 10a through 10d of the light detector 10 by the light that has been reflected from Layer 1. At the same time, another bigger beam spot f0 with a lower intensity is formed by the light that has been reflected from Layer 0. The beam spot f0 is substantially circular and covers the four photodetectors 10e almost equally. In other words, the photodetectors 10e are arranged so as to fall within the range of the beam spot f0.

The beam spot f0 becomes circular for the following reason. Specifically, the light reflected from Layer 0 converges in the vicinity of the anamorphic lens 9. Thus, almost no astigmatism is given by the anamorphic lens 9 to the light reflected from Layer 0. Accordingly, when the light reflected from Layer 0 enters the light detector 10, not an elliptical beam spot but a circular one is formed there.

Figure 18:
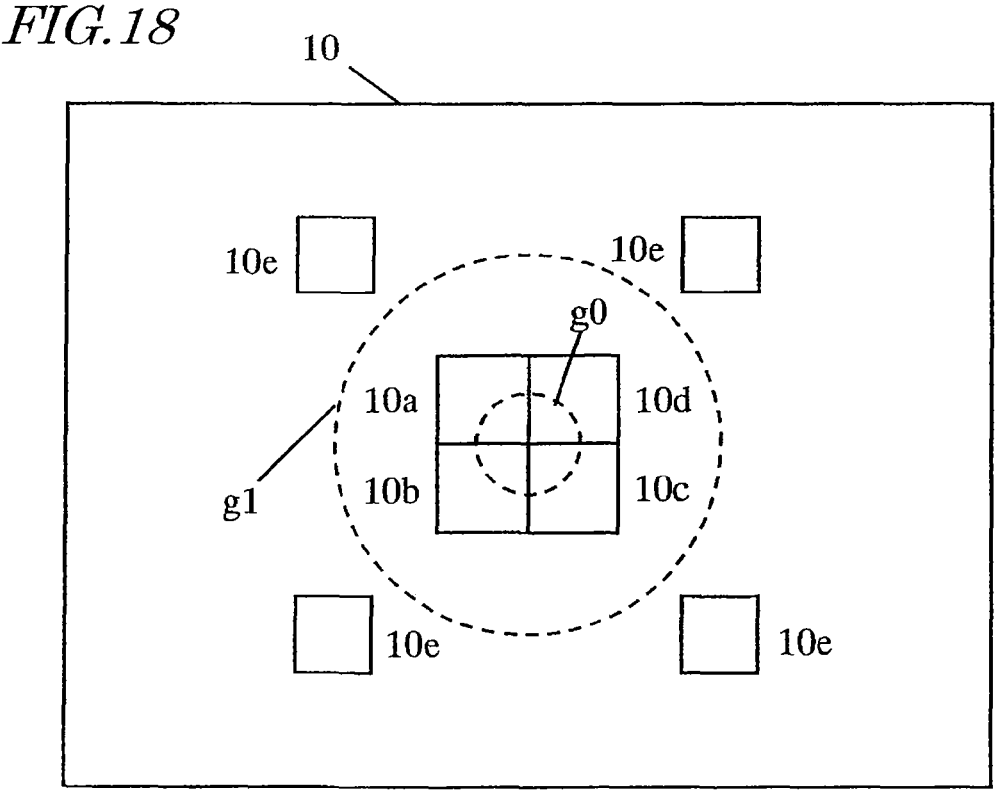
FIG. 18 shows the beam spot shapes of the respective reflected light beams entering the light detector 10 when the focal spot of the laser beam is located near Layer 0 of the optical disc 1.
Figure 19:
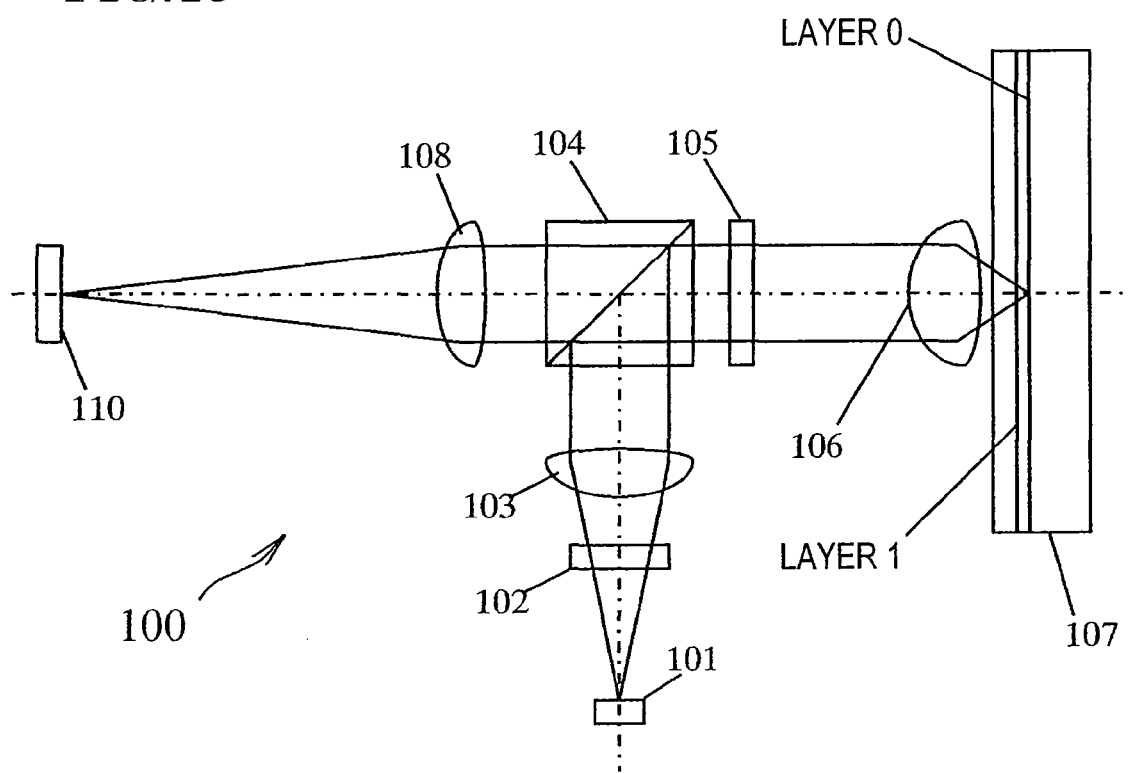
FIG. 19 shows a schematic configuration for members of an optical head 100 to carry out the layer sensing process.
Figure 20:
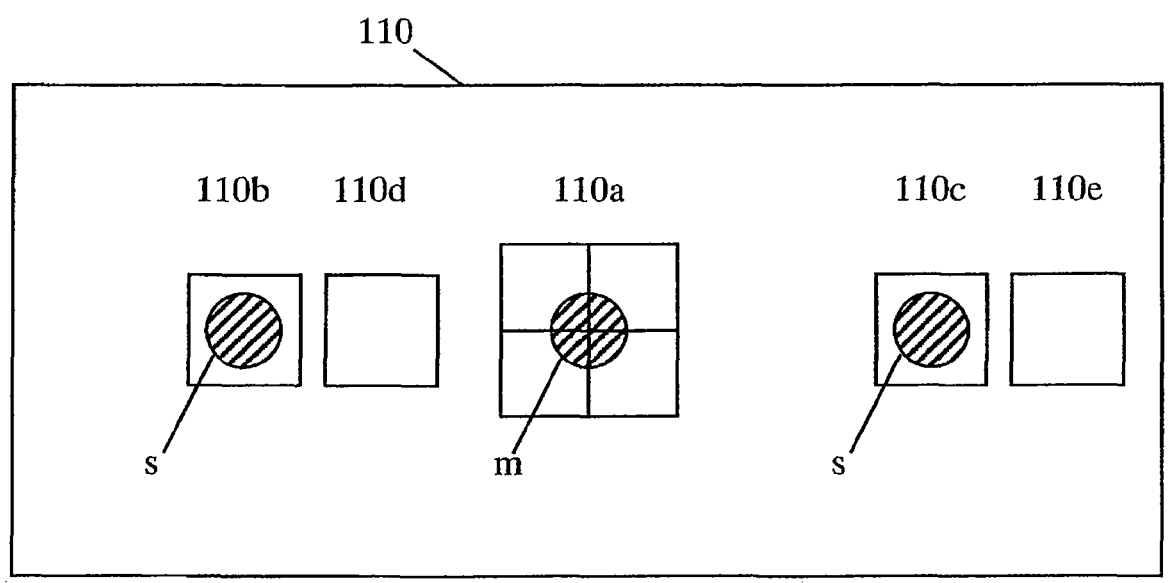
FIG. 20 shows an arrangement of five photodetectors 110a, 110b, 110c, 110d and 110e provided for the light detector 110.
Figure 21:
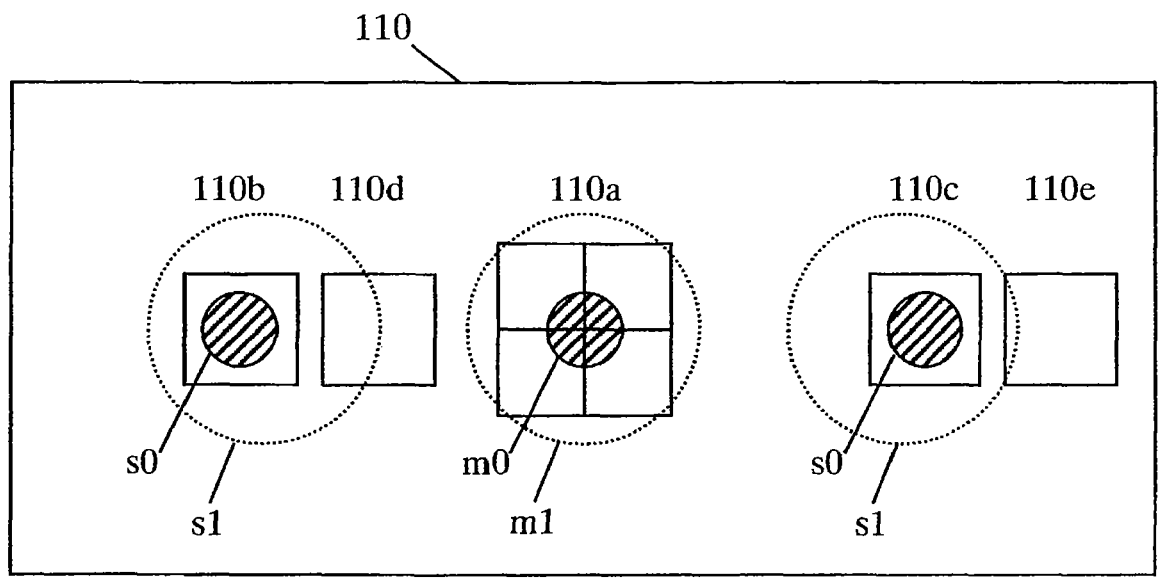
FIG. 21 shows where the respective reflected beams are incident on the light detector 110 when the laser beam is focused by the objective lens on Layer 0 of the optical disc 107.
Figure 22:
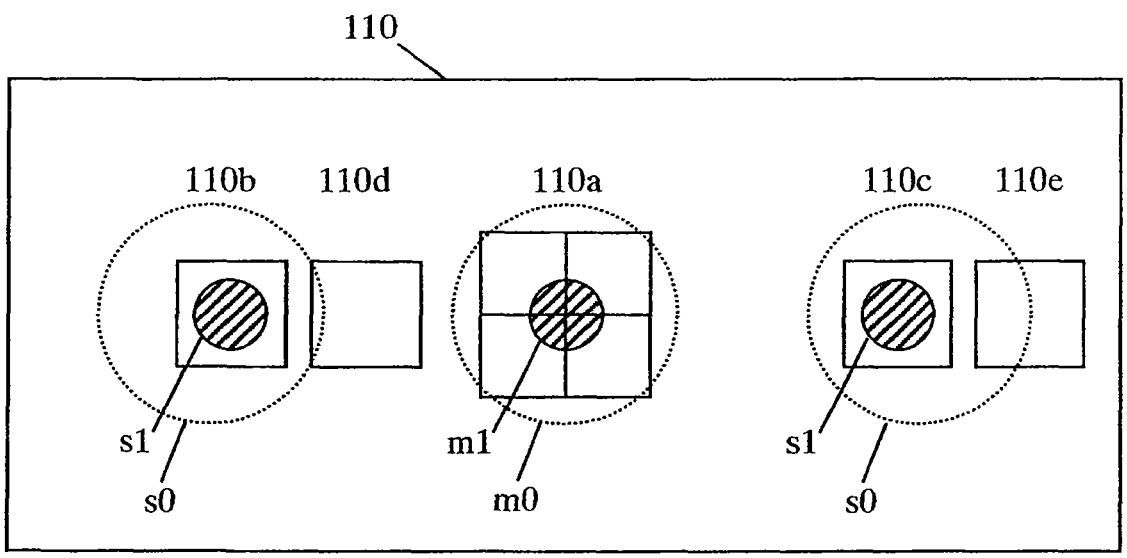
FIG. 22 shows where the respective reflected beams are incident on the light detector 110 when the laser beam is focused by the objective lens on Layer 1 of the optical disc 107.

On the other hand, FIG. 18 shows the beam spot shapes of the respective reflected light beams entering the light detector 10 when the focal spot of the laser beam is located near Layer 0 of the optical disc 1. A beam spot g0 is formed on the quadrant photodetector 10a through 10d of the light detector 10 by the light that has been reflected from Layer 0. At the same time, another bigger beam spot g1 is formed by the light that has been reflected from Layer 1.

In this case, the light reflected from Layer 1 enters the anamorphic lens 9 by way of the solid optical path shown in FIG. 16A. In this preferred embodiment, the edge portion of the reflected light is cut off by the ring like aperture 13 provided for the anamorphic lens 9. As a result, the beam spot g1 formed on the light detector 10 by the light reflected from Layer 1 decreases its size compared to the situation where no aperture 13 is provided.

It should be noted that in this case, the photodetectors 10e are provided outside of the beam spot's (g1) reach. Thus, the photodetectors 10e receive no light reflected from Layer 1. That is to say, the photodetectors 10e do receive the light reflected from Layer 0 when the focal spot of the laser beam is located near Layer 1 of the optical disc 1 but do not receive the light reflected from Layer 1 when the focal spot of the laser beam is located near Layer 0 of the optical disc 1. For that reason, a layer sensing signal can be generated by using the output light quantity signals of the photodetectors 10e. Consequently, in this preferred embodiment, the photodetectors 10e can also function as layer sensing photodetectors.

The arrangement of the photodetectors 10e is determined in view of the reflected light to be cut off by the aperture 13 and therefore has something to do with the size of the aperture 13, too. In this preferred embodiment, the size of the aperture 13 is preferably defined with respect to the photodetectors 10e in the following manner. Specifically, the size of the aperture 13 is preferably defined so as to cut off only the edge portion of the light reflected from Layer 1 (i.e., to shrink the beam spot g1) but not to affect any other beam spot f0, f1 or g0. Meanwhile, the photodetectors 10e are arranged on the light detector 10 so as to detect just the beam spot f0, not the beam spot g1.

In this preferred embodiment, the layer sensing signal RD is obtained as

RD=(output light quantity signal of photodetector(s) 10e)

In this case, the "light quantity signal" may be either the sum of the light quantity signals output from the four photodetectors 10e or the light quantity signal output from just one of the four photodetectors 10e. It should be noted that in case the beam spot g1 shifts significantly, if at least one of the four output light quantity signals of the four photodetectors 10e has a level less than a predetermined value, the eventual light quantity signal may be regarded as zero.

The layer sensing signal RD has a positive value with respect to the beam spot f0 (see FIG. 17) but becomes substantially equal to zero with respect to the beam spot g1 (see FIG. 18). Accordingly, as in the first preferred embodiment described above, if the layer sensing signal RD has a positive level near a zero cross point of the focus error signal FE, then the signal processor 20 may judge that the focal spot formed by the objective lens 6 is located near Layer 1. On the other hand, if the layer sensing signal RD has a substantially zero level near the zero cross point of the focus error signal FE, then the signal processor 20 may judge that the focal spot formed by the objective lens 6 is located near Layer 0.

In the third and fourth preferred embodiments described above, the focus error signal is supposed to be detected by the astigmatism method. However, as long as the optical system adopted includes an opaque region between the detector lens 8 and the light detector 10, that optical system is applicable to any other focus error signal detecting method. That is to say, if a servo signal detecting system to detect focus error and tracking error signals, for example, and a data signal detecting system are branched at a beam splitter, for example, an arrangement not depending on the servo signal detecting system can be easily obtained by providing an opaque region in the middle of the data signal detecting system.

Also, in the third and fourth preferred embodiments described above, four photodetectors for generating a layer sensing signal are arranged around the four corners of a photodetector for detecting a focus error signal. However, the present invention is in no way limited to those specific preferred embodiments. Alternatively, the arrangement and shapes of the photodetectors for generating the layer sensing signal may be arbitrarily defined as long as the layer sensing signal RD changes with the data storage layer on which the focal spot should be located.

Furthermore, in the preferred embodiments described above, the astigmatism is supposed to be produced by the anamorphic lens 9. Alternatively, the astigmatism may also be produced by any optical element other than a lens, e.g., a diffraction grating or a reflective mirror. Optionally, a so-called "liquid crystal lens", which is a combination of a liquid crystal material and an optical element (such as a prism or a lens), may also be used.

After the layer on which the focal spot is currently located has been detected by the layer sensing process of any of the preferred embodiments of the present invention described above, a verification process may also be carried out to verify the layer sensing result. Each data track on the optical disc 1 is given a unique address to specify the location of requested data on the optical disc. Accordingly, the optical disc drive may use those addresses as identification information to detect the layer in question. More specifically, the optical disc drive may perform a tracking control on an arbitrary data track, thereby reading any address from that data track. Then, based on the address obtained, the optical disc drive identifies a layer having that address and then determines whether or not that layer matches the layer detected by the layer sensing process.

Also, after the layer on which the focal spot is currently located has been estimated as Layer 0 and after the optical head has been moved to the innermost portion of that layer to read the TOC area 150 shown in FIG. 1D, that layer may turn out to have no TOC area 150. In that case, the previous decision was false, or the layer on which the focal spot is currently located is not Layer 0. Then, a so-called "focus jump" operation may be carried out to shift the focal spot to the other layer. More specifically, the signal processor 20 may transmit a predetermined pulse as a focus control signal, thereby driving the actuator coil 22 such that the objective lens 6 is moved perpendicularly to the optical disc 1. In this operation, the other layer can be located by using the layer sensing signal and/or the focus error signal.

In the preferred embodiments described above, the optical disc 1 is supposed to be a two-layered disc with two data storage layers. However, if the optical disc drive is loadable with an optical disc having three or more data storage layers, then the number of data storage layers included must be estimated first, and then processing needs to be carried out based on the estimated number of layers included. For example, an optical disc may be stored in a disc cartridge on which information about the number of layers included in the optical disc is described. In that case, the optical disc drive can know the number of layers included in the optical disc by reading out that information.

It is also imaginable that an optical disc with just one data storage layer (i.e., a single-layered disc) is loaded into the optical disc drive. In that case, first, the optical disc drive may suppose the given optical disc as a two-layered disc, change the location of the focal spot, and perform the layer sensing process of the preferred embodiment described above to obtain a normalized layer sensing signal RD (=Ra/Rb), for example. Then, the layer sensing photodetectors may be arranged just as described for the various preferred embodiments of the present invention. The optical disc drive can always obtain the layer sensing signal RD no matter whether the result of the layer sensing process is a two-layered disc or a single-layered disc.

However, the waveform of the layer sensing signal RD of the two-layered disc is significantly different from that of the layer sensing signal RD of the single-layered disc. More specifically, when the optical disc drive is loaded with the two-layered disc, the layer sensing signal RD changes from a positive level into zero, or vice versa (see FIG. 8, for example). On the other hand, when the optical disc drive is loaded with the single-layered disc, the layer sensing signal RD always has a positive high level and never become equal to zero at any zero cross point of the focus error signal. This is because the light that has been reflected from the surface of the single-layered disc is detected at the layer sensing photodetectors. The light quantity signals supplied from the respective layer sensing photodetectors have a low level but a layer sensing signal RD that is high enough to detect can be obtained by performing the layer sensing signal normalizing process. Even if the two-layered disc has been loaded, the light that has been reflected from the surface is also detected at the layer sensing photodetectors but its effect is negligible. This is because the intensity of the light reflected from each layer of the two-layered disc is much higher than that of the light reflected from the surface.

Accordingly, if the layer sensing signal falls to a low level in the vicinity of any zero cross point of the focus error signal, then the signal processor 20 may judge the given optical disc as a two-layered disc. On the other hand, if the layer sensing signal maintains a high level, then the signal processor 20 may regard the given optical disc as a single-layered disc. The signal processor 20 performs the layer sensing process on the given optical disc in this manner, to estimate the number of layers included in the optical disc and recognizing the type of the optical disc.

An optical information processor including an optical head according to a preferred embodiment of the present invention can sense very quickly on or near what data storage layer of a given optical disc the focal spot of the light is currently located. Thus, an optical disc drive, which can start a data read or write operation in a significantly shorter time from the time it was booted, is realized. In addition, an optical disc drive, which can switch layers to read data from, or write data on, swiftly and reliably while performing a read or write operation on one of multiple layers, is also realized.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2003-169064 filed on Jun. 13, 2003 and No. 2004-167046 filed on Jun. 4, 2004, the entire contents of which are hereby incorporated by reference.

We claim:

1. An optical data processing apparatus for reading and/or writing data from/on first and second data storage media of different types, comprising:
    a light source for radiating light;
    a focusing optical system for forming a focal spot by condensing the light that has been emitted from the light source;
    a light detector, which includes at least one photodetector for receiving the light and generating a light quantity signal representing a quantity of the light received;
    a detecting optical system for guiding reflected light beams, which have been reflected from a storage layer of a loaded storage medium to the light detector; and
    a signal processor for generating a layer sensing signal from the light quantity signal and recognizing the type of the loaded data storage medium by the layer sensing signal,
    wherein the light detector includes, as the at least one photodetector, a layer sensing photodetector, which is arranged in view of an area of the light detector where:
        a reflected light beam from a surface and/or a storage layer of the first data storage medium is incident when the focal spot is located near the storage layer of the first data storage medium, and
        a reflected light beam from a surface and/or a storage layer of the second data storage medium is incident when the focal spot is located near the storage layer of the second data storage medium, and
    wherein the light detector further includes a photodetector which receives the reflected light beam to generate a focus error signal and which is different from the layer sensing photodetector.

2. An optical data processing apparatus for reading and/or writing data from/on first and second data storage media of different types, comprising:
    a light source for radiating light;
    a focusing optical system for forming a focal spot by condensing the light that has been emitted from the light source;
    a light detector, which includes at least one photodetector for receiving the light and generating a light quantity signal representing a quantity of the light received;
    a detecting optical system for guiding reflected light beams, which have been reflected from a storage layer of a loaded storage medium to the light detector; and
    a signal processor for generating a layer sensing signal from the light quantity signal and recognizing the type of the loaded data storage medium by the layer sensing signal,
    wherein the light detector includes, as the at least one photodetector, a layer sensing photodetector, which is arranged in view of an area of the light detector where:
        a reflected light beam from a surface and/or a storage layer of the first data storage medium is incident when the focal spot is located near the storage layer of the first data storage medium, and
        a reflected light beam from a surface and/or a storage layer of the second data storage medium is incident when the focal spot is located near the storage layer of the second data storage medium, and
    wherein the light detector further includes a photodetector which receives the reflected light beam to generate a data signal representing data and which is different from the layer sensing photodetector.

3. An optical data processing apparatus for reading and/or writing data from/on first and second data storage media of different types, comprising:
    a light source for radiating light;
    a focusing optical system for forming a focal spot by condensing the light that has been emitted from the light source;
    a light detector, which includes at least one photodetector for receiving the light and generating a light quantity signal representing a quantity of the light received;

a detecting optical system for guiding reflected light beams, which have been reflected from a storage layer of a loaded storage medium to the light detector; and a signal processor for generating a layer sensing signal from the light quantity signal and recognizing the type of the loaded data storage medium by the layer sensing signal, wherein the light detector includes, as the at least one photodetector, a layer sensing photodetector, which is arranged in view of an area of the light detector where:

a reflected light beam from a surface and/or a storage layer of the first data storage medium is incident when the focal spot is located near the storage layer of the first data storage medium, and a reflected light beam from a surface and/or a storage layer of the second data storage medium is incident when the focal spot is located near the storage layer of the second data storage medium, and wherein the layer sensing photodetector receives a part of the reflected light beam in which no optical axis is included.

4. The optical data processing apparatus of claim 1, wherein the first and the second data storage media have different structure.

5. The optical data processing apparatus of claim 2, wherein the first and the second data storage media have different structure.

6. The optical data processing apparatus of claim 3, wherein the first and the second data storage media have different structure.

* * * * *